US012553264B2

(12) United States Patent
Yokota

(10) Patent No.: US 12,553,264 B2
(45) Date of Patent: Feb. 17, 2026

(54) VEHICLE DOOR LOCK DEVICE

(71) Applicant: MITSUI KINZOKU ACT CORPORATION, Yokohama (JP)

(72) Inventor: Yoshiaki Yokota, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 56 days.

(21) Appl. No.: 18/492,465

(22) Filed: Oct. 23, 2023

(65) Prior Publication Data

US 2024/0133217 A1 Apr. 25, 2024
US 2024/0229519 A9 Jul. 11, 2024

(30) Foreign Application Priority Data

Oct. 24, 2022 (JP) ................................ 2022-169662
Mar. 6, 2023 (JP) ................................ 2023-033458

(51) Int. Cl.
*E05B 81/14* (2014.01)
*E05B 81/06* (2014.01)
(Continued)

(52) U.S. Cl.
CPC .............. *E05B 81/14* (2013.01); *E05B 81/06* (2013.01); *E05B 81/15* (2013.01); *E05B 81/30* (2013.01);
(Continued)

(58) Field of Classification Search
CPC .......... E05B 81/06; E05B 81/14; E05B 81/15; E05B 81/30; E05B 81/34; E05B 81/40;
(Continued)

(56) References Cited

U.S. PATENT DOCUMENTS 5,332,273 A * 7/1994 Komachi ................ E05B 81/25 292/336.3
6,997,488 B2 * 2/2006 Kurten .................... E05B 81/14 292/216
(Continued)

FOREIGN PATENT DOCUMENTS

CN 113818760 A 12/2021
JP H0719544 U 4/1995
(Continued)

OTHER PUBLICATIONS

Office Action, issued in Chinese Patent Application No. 202311365003.0 dated Dec. 25, 2025, (with Concise Explanation of Relevance).

*Primary Examiner* — Kristina R Fulton
*Assistant Examiner* — Noah Horowitz
(74) *Attorney, Agent, or Firm* — NIXON & VANDERHYE

(57) ABSTRACT

A vehicle door operating device includes: a casing including a base; a latch supported on the base in a manner of being pivotally movable by a shaft oriented in up-down directions; a ratchet supported on the base in a manner of being pivotally movable by a shaft oriented upward and downward; a motor arranged in the casing such that a rotary shaft is oriented leftward and rightward; and a lead screw supported in the casing in a pivotally movable manner such that a rotation axial direction is oriented in left-right directions, having a gear part engaging with a pinion gear of the motor and a spiral groove line part with which an operated part provided in the ratchet directly engages, and moving the ratchet from the engagement position to the release position by one rotation in one direction in accordance with rotation of the rotary shaft of the motor.

16 Claims, 17 Drawing Sheets

(51) Int. Cl.

| | |
|---|---|
| ***E05B 81/30*** | (2014.01) |
| ***E05B 81/34*** | (2014.01) |
| ***E05B 81/42*** | (2014.01) |
| *E05B 85/02* | (2014.01) |

(52) U.S. Cl.
CPC .............. *E05B 81/34* (2013.01); *E05B 81/42* (2013.01); *E05B 85/02* (2013.01)

(58) Field of Classification Search
CPC .......... E05B 81/42; E05B 83/16; E05B 83/18; E05B 83/24
See application file for complete search history.

(56) References Cited

U.S. PATENT DOCUMENTS

| | | | | |
|---|---|---|---|---|
| 7,475,920 | B2 * | 1/2009 | Bigazzi | E05B 81/14 292/216 |
| 10,648,201 | B2 * | 5/2020 | Cumbo | E05B 77/06 |
| 10,837,205 | B2 * | 11/2020 | Ishiguro | E05B 81/15 |
| 10,914,102 | B2 * | 2/2021 | Hunt | E05B 81/15 |
| 11,072,948 | B2 * | 7/2021 | Patane | E05B 81/42 |
| 11,131,127 | B2 * | 9/2021 | Hunt | E05B 81/20 |
| 11,313,157 | B2 * | 4/2022 | Im | E05B 81/06 |
| 12,264,512 | B2 * | 4/2025 | Katagawa | E05B 81/14 |
| 12,281,697 | B2 * | 4/2025 | Szegeny | E05B 17/007 |
| 2008/0224482 | A1 * | 9/2008 | Cumbo | E05B 81/40 292/201 |
| 2017/0159334 | A1 | 6/2017 | Ishiguro | |
| 2018/0355644 | A1 * | 12/2018 | Jeong | E05B 83/18 |
| 2021/0396054 | A1 | 12/2021 | Okawa et al. | |
| 2023/0349203 | A1 * | 11/2023 | Louda | E05B 81/15 |
| 2024/0376754 | A1 * | 11/2024 | Szegeny | E05B 81/30 |

FOREIGN PATENT DOCUMENTS

| | | | |
|---|---|---|---|
| JP | H1061288 | A | 3/1998 |
| JP | 2000054709 | A | 2/2000 |
| JP | 2007100390 | A | 4/2007 |
| JP | 2008013932 | A | 1/2008 |
| JP | 4755544 | B2 | 6/2011 |
| JP | 2013213342 | A | 10/2013 |
| JP | 2016008408 | A | 1/2016 |
| JP | 2016014235 | A | 1/2016 |
| JP | 6427803 | B2 | 11/2018 |

* cited by examiner

Enlarged View of A part

VEHICLE DOOR LOCK DEVICE

FIELD OF THE INVENTION

The present invention relates to a vehicle door lock device for causing a door supported openably and closeably on a vehicle body to engage with a striker, thereby holding the door in a closed state. More specifically, the present invention relates to a vehicle door lock device which, in addition to a function of holding the door in the closed state, enables the door to be opened by releasing the state of engagement with the striker by electroactuation.

BACKGROUND OF THE INVENTION

For example, as disclosed in JP4755544B, JP6427803B, and JPH10-61288A, a vehicle door lock device, which can disengage the state of engagement with the striker by electroactuation, includes, as main components, a base, a latch supported on the base in a pivotally movable manner and being capable of meshing with the striker when the door is closed, a ratchet supported on the base in a pivotally movable manner and engaging with the latch to prevent pivotal movement toward an open direction of the latch, and an electrically-driven release mechanism (actuator mechanism) that is supported by the base and includes a motor that outputs motive power for pivotally moving the ratchet engaging with the latch in a release direction for separating the ratchet engaging with the latch from the latch.

SUMMARY OF THE INVENTION

However, in a vehicle door lock device disclosed in JP4755544B, an electrically-driven release mechanism is configured to include a motor, a worm wheel that meshes with a worm provided in a rotary shaft of the motor and can move pivotally in a disengagement direction from a neutral position, and an open lever that engages with a gear provided in the worm wheel and oscillates to thereby pivotally move the ratchet in the release direction. There is also adopted the following configuration in which the rotation axial direction of the worm wheel is orthogonal to the axial direction of the rotary shaft of the motor and the worm wheel is returned to the neutral position by a biasing force of a return spring. Therefore, the above door lock device has problems that the number of components of the electrically-driven release mechanism increases which invites increased complexity for the structure, and the motor and the worm wheel are disposed on the same plane which invites an increase to the size of the device in a planar view.

In a vehicle door lock device disclosed in JP6427803B, an electrically-driven release mechanism is configured to include a motor, a worm wheel that engages with a worm provided in a rotary shaft of the motor and can move pivotally in a release direction from a neutral position, and an open lever capable of transmitting the pivotal movement of the worm wheel to the ratchet (pole) as a release operation. There is also adopted the following configuration in which the rotation axial direction of the worm wheel is orthogonal to the axial direction of the rotary shaft of the motor and the worm wheel is returned to the neutral position by a biasing force of a return spring. Therefore, as in JP4755544B, the above door lock device has problems that the number of components of the electrically-driven release mechanism increases which invites increased complexity for the structure and the motor and the worm wheel are disposed on the same plane which invites an increase to the size of the device in a planar view.

In a vehicle door lock device disclosed in JPH10-61288A, an electrically-driven release mechanism is configured to include a motor, a spindle capable of rotating around the same axial line as the rotary shaft of the motor, a spindle nut that is screwed to the spindle to thereby linearly move from a start position (neutral position) in conjunction with rotation of the spindle and is returned to the start position by a return spring after the motor stops, and an unlock lever for transmitting the linear movement of the spindle nut to the ratchet (retention claw) as an release operation to cause the ratchet to perform a release operation. The above configuration does not include the worm wheel as in JP4755544B and JP6427803B, but includes the spindle, the spindle nut, the return spring, and the unlock lever. Therefore, the above configuration has problems that the number of components increases which invites increased complexity for the configuration and invites an increase to the size of the device in a planar view.

With the above problems taken into consideration, the present invention relates to a vehicle door lock device having a configuration that can be simplified and can be reduced in size by realizing an optimum layout of a motor and components corresponding to the motor.

According to the present invention, the above problems are solved as follows.

A vehicle door lock device according to the present invention is characterized by having: a casing including a base fixed to either of a door or a vehicle body; a latch supported on the base such that the latch can pivotally move by a latch shaft oriented upward and downward and can engage with a striker provided on the other of the door or the vehicle body when the door is closed; a ratchet supported on the base such that the ratchet can pivotally move by a ratchet shaft oriented up-down directions, holding the latch at a latch position at an engagement position for engaging with the latch, and being capable of pivotally moving to a release position at which the ratchet moves from the engagement position in the release direction to disengage from the latch and can move to an unlatch position; a motor having a rotary shaft disposed on the casing such that the rotary shaft is oriented in left-right directions and having a pinion gear fastened to the rotary shaft; and an actuating member having a gear part supported in the casing to be capable of pivotally moving such that a rotation axial direction is oriented in left-right directions and engaging with the pinion gear and a spiral groove line part with which an operated part provided at a rear end of the ratchet directly engages, and moving the ratchet from the engagement position to the release position by having one rotation in one direction in accordance with rotation by the rotary shaft. While this configuration allows the device to be reduced in size, this simple configuration makes it possible to cause the ratchet to reliably release-operate by motive power from a motor.

According to the present invention, while the layouts of the motor and the actuating member are considered to be optimized, the configuration can be simplified to reduce the size of the device.

18 is an enlarged planar view showing main parts when an actuating member is at a neutral position as the other embodiment of the present invention.

Figure 19:
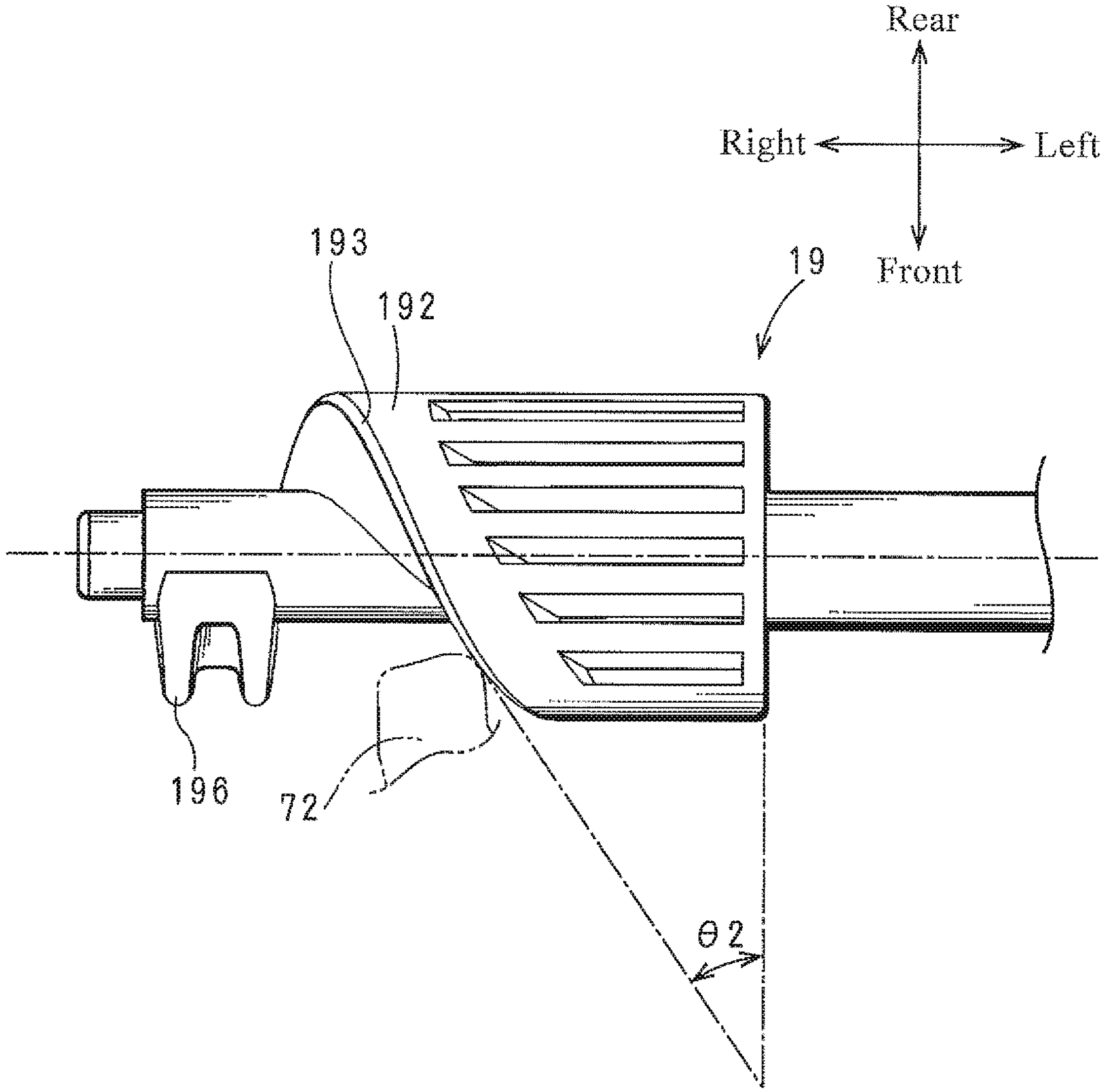

FIG. 19 is an enlarged planar view showing main parts when an actuating member rotates in one direction by a predetermined angle as the other embodiment of the present invention.

Figure 20:
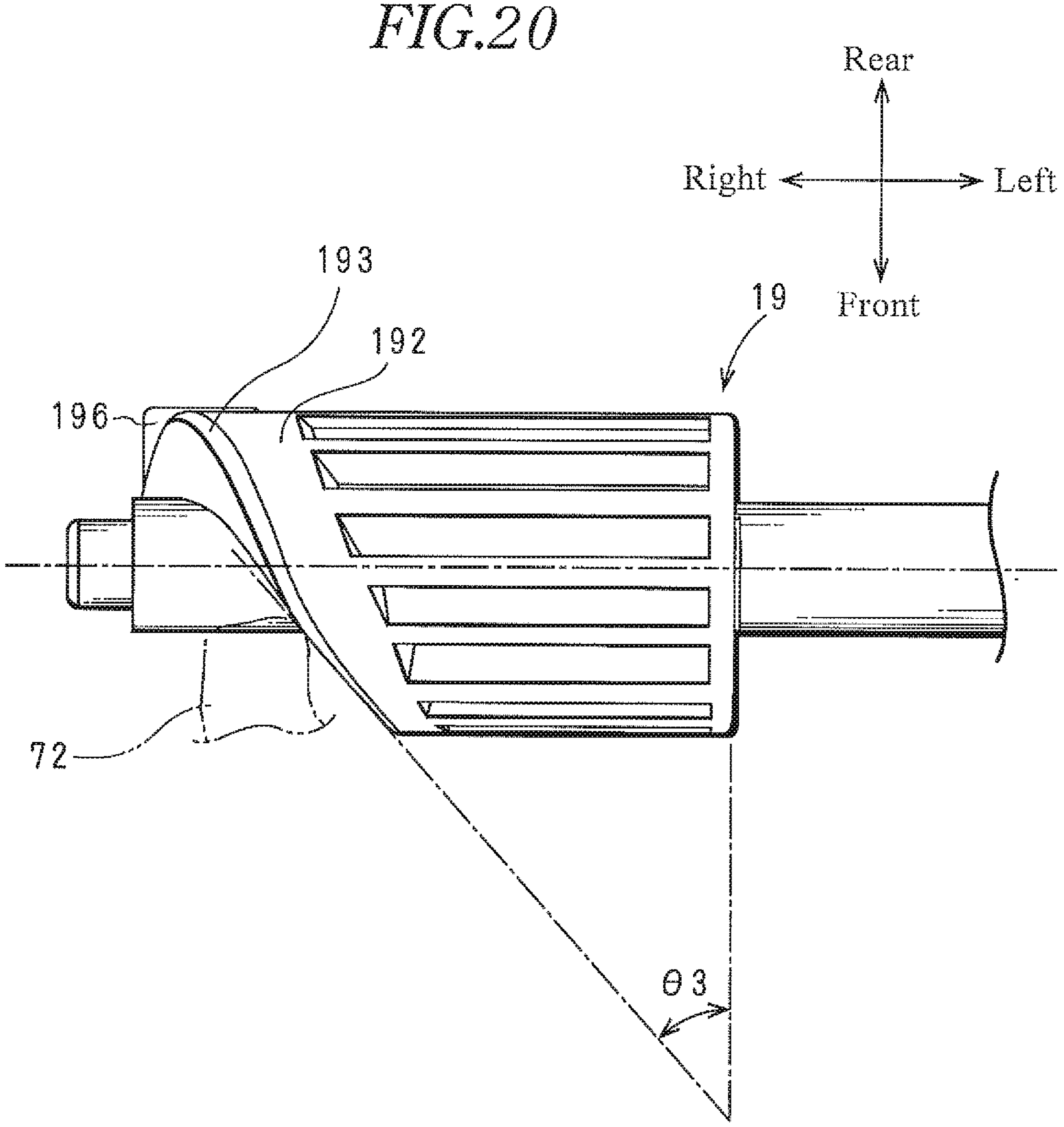

FIG. 20 is an enlarged planar view showing main parts when an actuating member rotates in one direction further than in FIG. 19 as the other embodiment of the present invention.

EMBODIMENTS OF THE INVENTION

A vehicle door lock device according to the present invention is characterized by having: a casing including a base fixed to either of a door or a vehicle body; a latch supported on the base such that the latch can pivotally move by a latch shaft oriented upward and downward and can engage with a striker provided on the other of the door or the vehicle body when the door is closed; a ratchet supported on the base such that the ratchet can pivotally move by a ratchet shaft oriented up-down directions, holding the latch at a latch position at an engagement position for engaging with the latch, and being capable of pivotally moving to a release position at which the ratchet moves from the engagement position in the release direction to disengage from the latch and can move to an unlatch position; a motor having a rotary shaft disposed on the casing such that the rotary shaft is oriented in left-right directions and having a pinion gear fastened to the rotary shaft; and an actuating member having a gear part supported in the casing to be capable of pivotally moving such that a rotation axial direction is oriented in left-right directions and engaging with the pinion gear and a spiral groove line part with which an operated part provided at a rear end of the ratchet directly engages, and moving the ratchet from the engagement position to the release position by having one rotation in one direction in accordance with rotation by the rotary shaft.

Preferably, in a planar view, the actuating member is disposed between the motor and a grouping of the latch and the ratchet such that the gear part is on the latch side and disposed outside a movement range of the latch. This configuration allows the actuating member to be disposed at a position near a portion where the latch and the ratchet are engaged, so that the device can be further reduced in size.

Preferably, the actuating member has one rotation in one direction from the neutral position by the rotation of the rotary shaft and comes into contact with the operated part of the ratchet to stop at the neutral position. This configuration allows the actuating member to reliably stop at the neutral position. Further, a return spring as in the prior art is not required and thus the configuration is simplified and it is not necessary to rotate the actuating member against the biasing force of the return spring. Therefore, the ratchet can be operated in the release direction by a small motor having a small output.

Preferably, the actuating member has an elastic part that fits into an engagement groove provided in the casing at the neutral position to enable the actuating member to be held at the neutral position. This configuration allows the actuating member to be held at the neutral position.

Preferably, the engagement groove is shaped to allow the actuating member to rotate in one direction, while preventing the actuating member from rotating in the other direction opposite to the one direction, when the elastic part fits into the engagement groove. This configuration can prevent the actuating member from rebounding when stopping the actuating member at the neutral position and allows the actuating member to reliably stop at the neutral position.

Preferably, a lead angle of the groove line part in the actuating member is varied such that, the further the ratchet is moved in the release direction, the lower the movement speed of the ratchet is. This configuration can reduce a contact sound at the time of stopping the actuating member at the neutral position and a contact sound at the time of causing the ratchet to come into contact with the casing and stopping the ratchet at a position farther from the release position.

Preferably, the actuating member has a slit that extends in the rotation axial direction and matches a trajectory of the operated part of the ratchet when the actuating member is at the neutral position, and allows the operated part of the ratchet to freely move in the slit in the rotation axial direction when the actuating member is at the neutral position. This configuration allows the ratchet to smoothly move pivotally without being subjected to resistance by other elements when the actuating member is at the neutral position.

Preferably, the casing further includes a meshing cover that is fixed to the base and covers the latch and the ratchet, and supports, on the engagement cover, a memory lever for moving the ratchet to a block position at which the ratchet can be held at the release position when the ratchet moves to the release position. In this configuration, providing the memory lever in particular can prevent, for example, the following disadvantage of, due to the weight of snow accumulated on the vehicle body at a time of snowfall, the door not opening even by causing the motor to release-operate the ratchet and the ratchet engaging with the latch again.

Further, the memory lever is supported on the meshing cover side, so that the memory lever can be overlappingly disposed on the ratchet. Therefore, it is possible to deter the horizontal projection surface area of the casing from increasing in a planar view.

Preferably, if the latch moves to the unlatch position, the memory lever is in contact with the latch, thereby moving from the block position to an unblock position which permits pivotal movement to the engagement position of the ratchet. This configuration enables pivotal movement to the engagement position of the ratchet during the closing operation after the door is opened.

Preferably, the casing further includes a motor cover that is fixed to the base, the motor and the actuating member being supported within the motor cover. This configuration can prevent rainwater from entering particularly into a region in which the motor is disposed.

Preferably, the configuration in which the latch and the ratchet are supported on the base is used as an engagement unit, the configuration in which the motor and the actuating member are supported within the motor cover is used as an actuator unit, and the motor cover of the actuator unit is fixed to the base of the engagement unit, so that the operated part of the ratchet engages with the groove line part of the actuating member. This configuration allows the device to be assembled more efficiently.

Preferably, in the motor cover, an electrically-conductive terminal to be electrically connected to the motor is accommodated and a connector is provided with plug-in and plug-out directions of a connection-counterpart connector as up-down directions. This configuration makes it possible to keep the connector within the horizontal projection area of the casing and to deter the horizontal projection area in the device from being enlarged. The configuration further makes it possible to connect the connection-counterpart connector from both left and right sides, thereby improving an ability to be mounted on a vehicle.

Preferably, among the movable elements including the latch, the ratchet, the motor, the actuating member, and the gear part, a size in upward and downward directions of a part in which an uppermost part of the gear part is located is maximized. This configuration can reduce the size in the thickness direction of the device.

Hereinafter, one embodiment of the present invention will be described based on the drawings. Directions used in the explanation below are based on a state in which a vehicle door lock device 1 according to the present invention is attached to a rear door of a vehicle. Thus, if a mode of the vehicle door lock device 1 being attached to a vehicle differs from the present embodiment, the directions used below vary as a matter of course.

The vehicle door lock device 1 is mounted to a lower part of a lift-type rear door and has a function of meshing with a (non-illustrated) lift-type rear door (door supported to have an upper end part in a vehicle body rear part in a pivotally movable manner around a hinge shaft in left and right directions) striker 2 (see FIGS. 7 and 8) fixed to the vehicle body side which can open and close the rear opening opened in a vehicle body rear part and used for, for example, putting in and taking out luggage, thereby holding the rear door at a closed position, and a function of disengaging engagement with the striker 2 to allow the rear door to be opened.

As shown in FIGS. 1 to 6, the vehicle door lock device 1 includes a meshing unit 3 which can engage with the striker 2 and an actuator unit 4 for disengaging a state of engagement with the striker 2.

The meshing unit 3 includes: a metal base 5 fixed by a (non-illustrated) bolt to a lower part of a rear door and forming part of a casing (with no specific reference numeral); a latch 6 and a ratchet 7 supported on the base 5 in a pivotally movable manner; a meshing cover 8 made from synthetic resin and fixed to an upper side of the base 5 and forming part of the casing; a memory lever 9 supported on a reverse side (lower surface side) of the meshing cover 8; and a metal sub-plate 10 for reinforcement.

The actuator unit 4 includes: a motor cover 17 fixed to a rear upper surface of the base 5, further forming another part of the casing, and made from a synthetic resin; a motor 18 supported within the motor cover 17 as well as an actuating member 19 rotating by motive power from the motor 18 and converting the rotation into a linear motion to transmit the rotation to the ratchet 7; a detection switch 20 for detecting a position of the ratchet 7; and a connector 21 that accommodates electrically-conductive terminals 21*a* to be electrically connected to the motor 18 and the detection switch 20.

(Meshing Unit 3)

Figure 1:
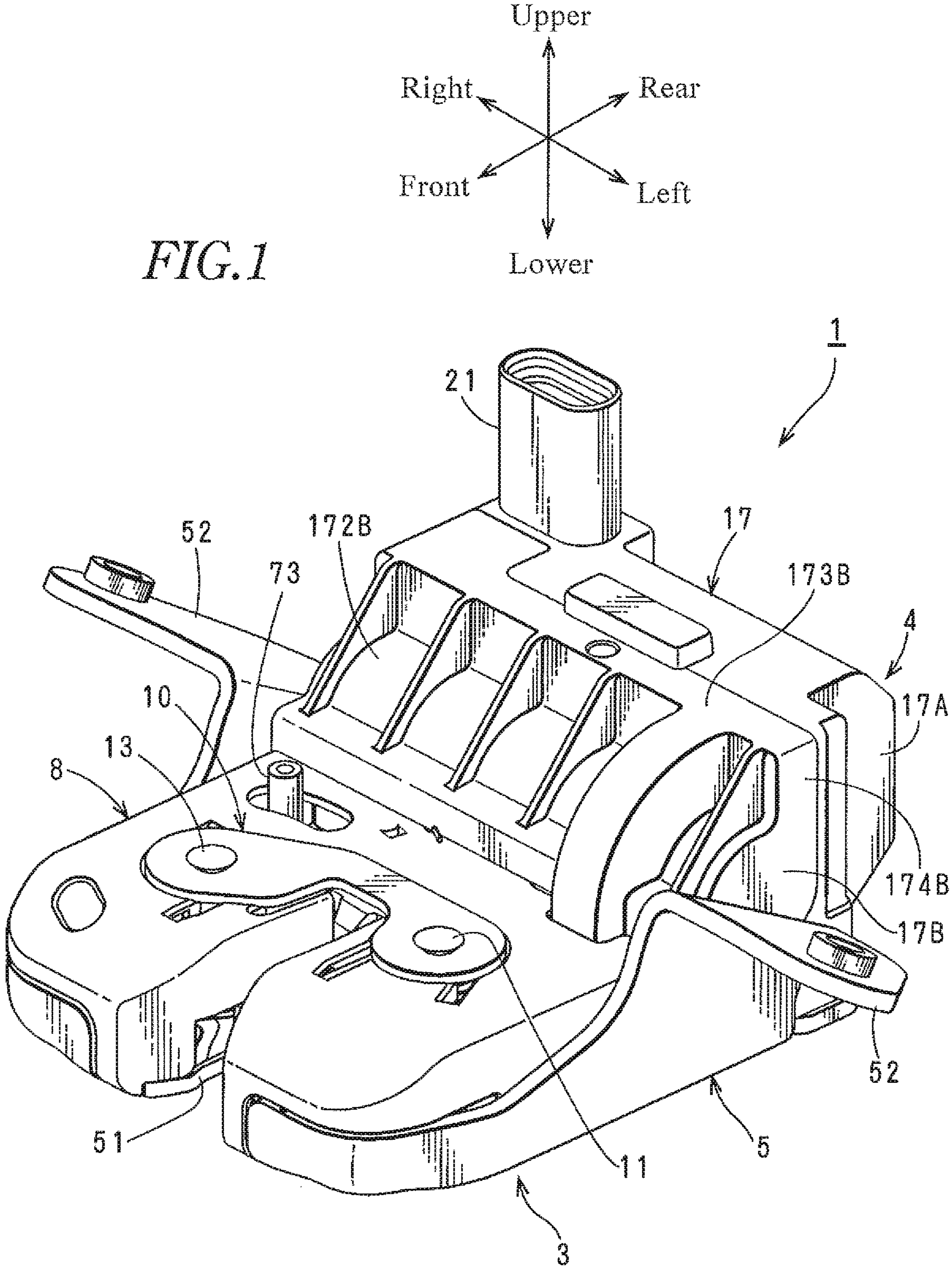
FIG. 1 is a perspective view showing a vehicle door lock device according to one embodiment of the present invention.
Figure 2:
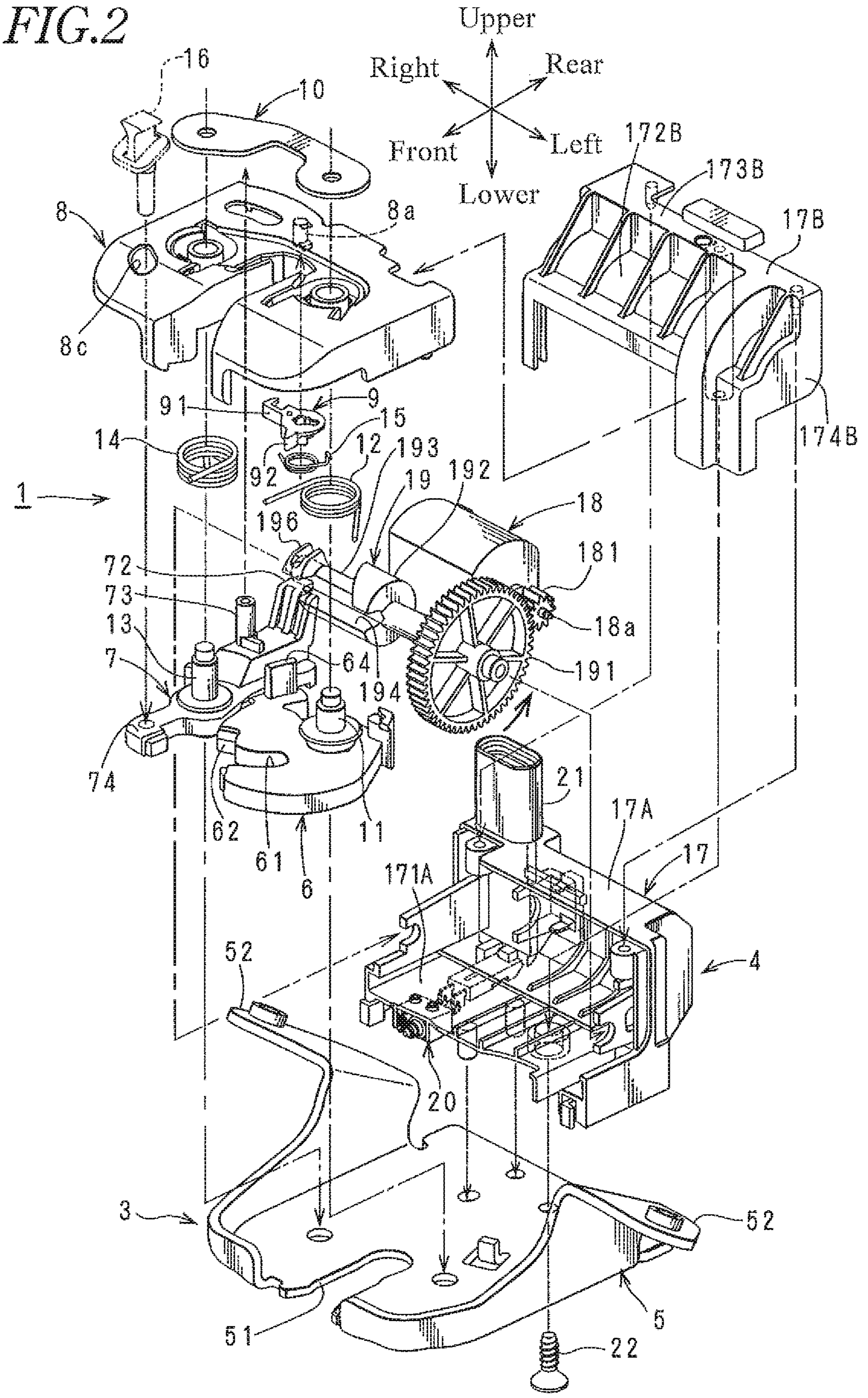
FIG. 2 is an exploded perspective view showing the vehicle door lock device in FIG. 1.

As is understandable from FIG. 2 in particular, the base 5 includes a striker entry groove 51, of which the front thereof has an opening that allows the striker 2 to enter from the front side when the rear door is closed, and left and right attachment pieces 52, 52, and is fixed to the lower part of the rear door by the attachment pieces 52, 52 being fastened to the lower part of the rear door by a (non-illustrated) bolt.

Figure 7:
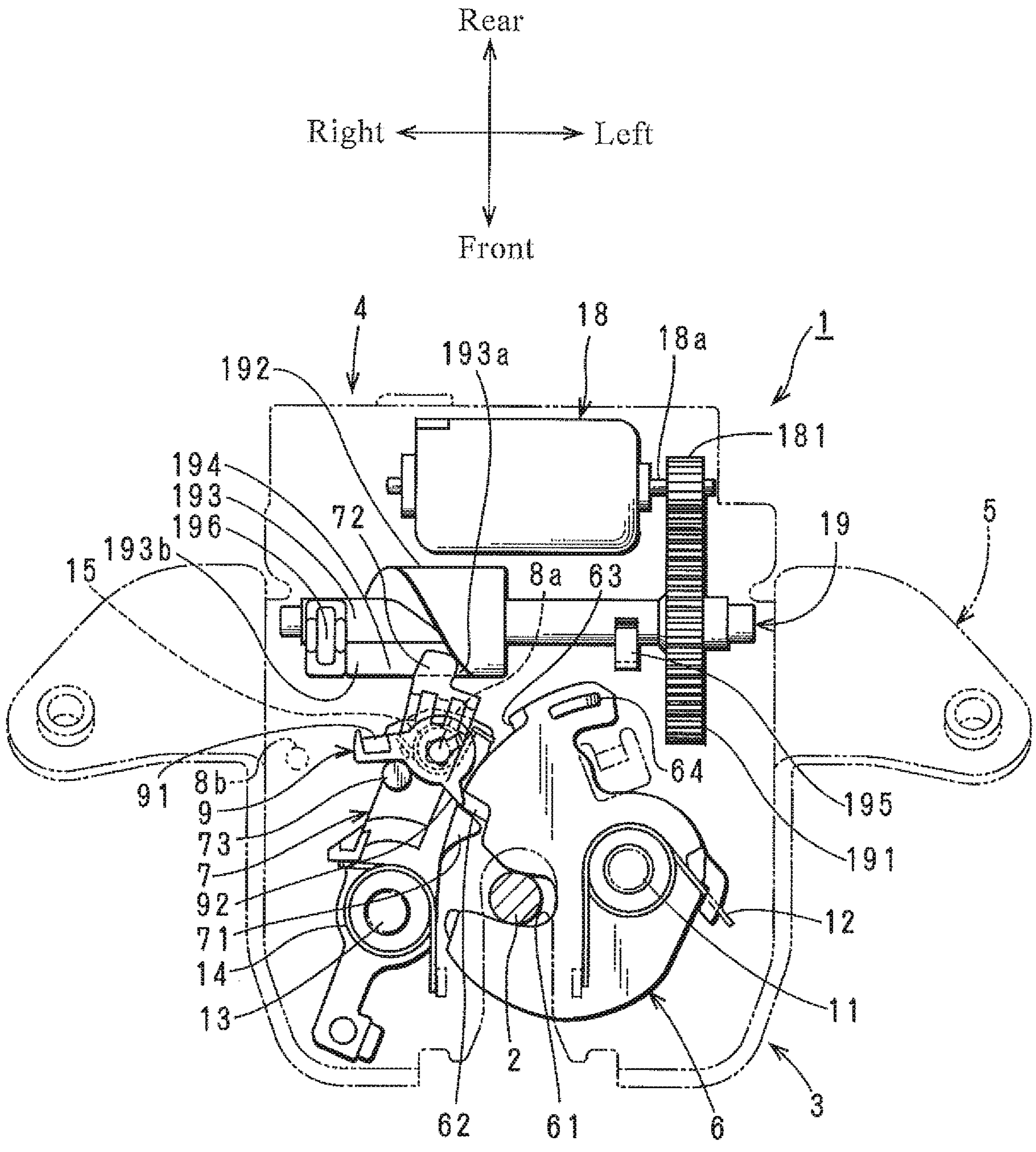
FIG. 7 is a planar view showing main parts in a latched state.
Figure 8:
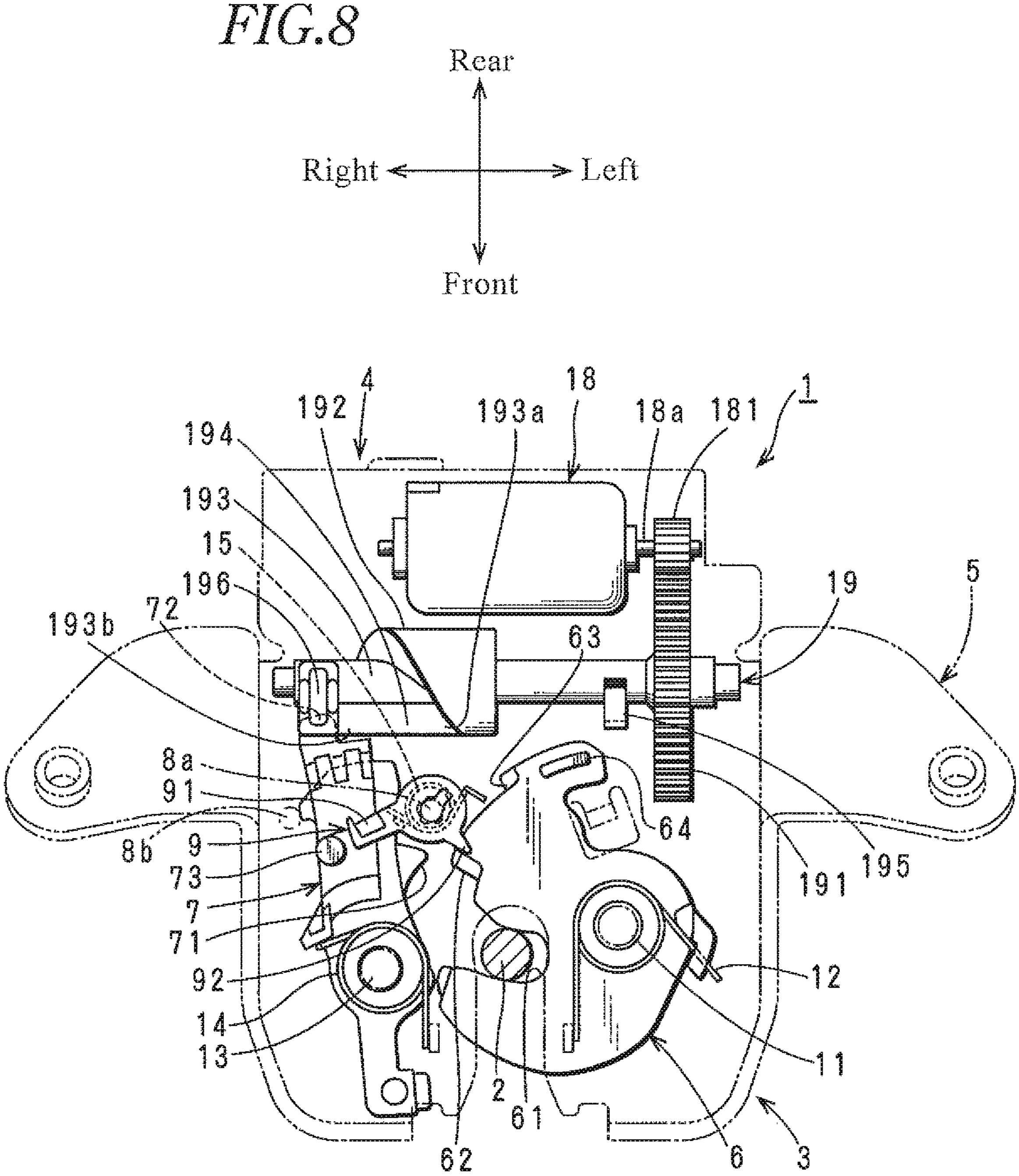
FIG. 8 is a planar view showing main parts at a time of a release operation.
Figure 9:
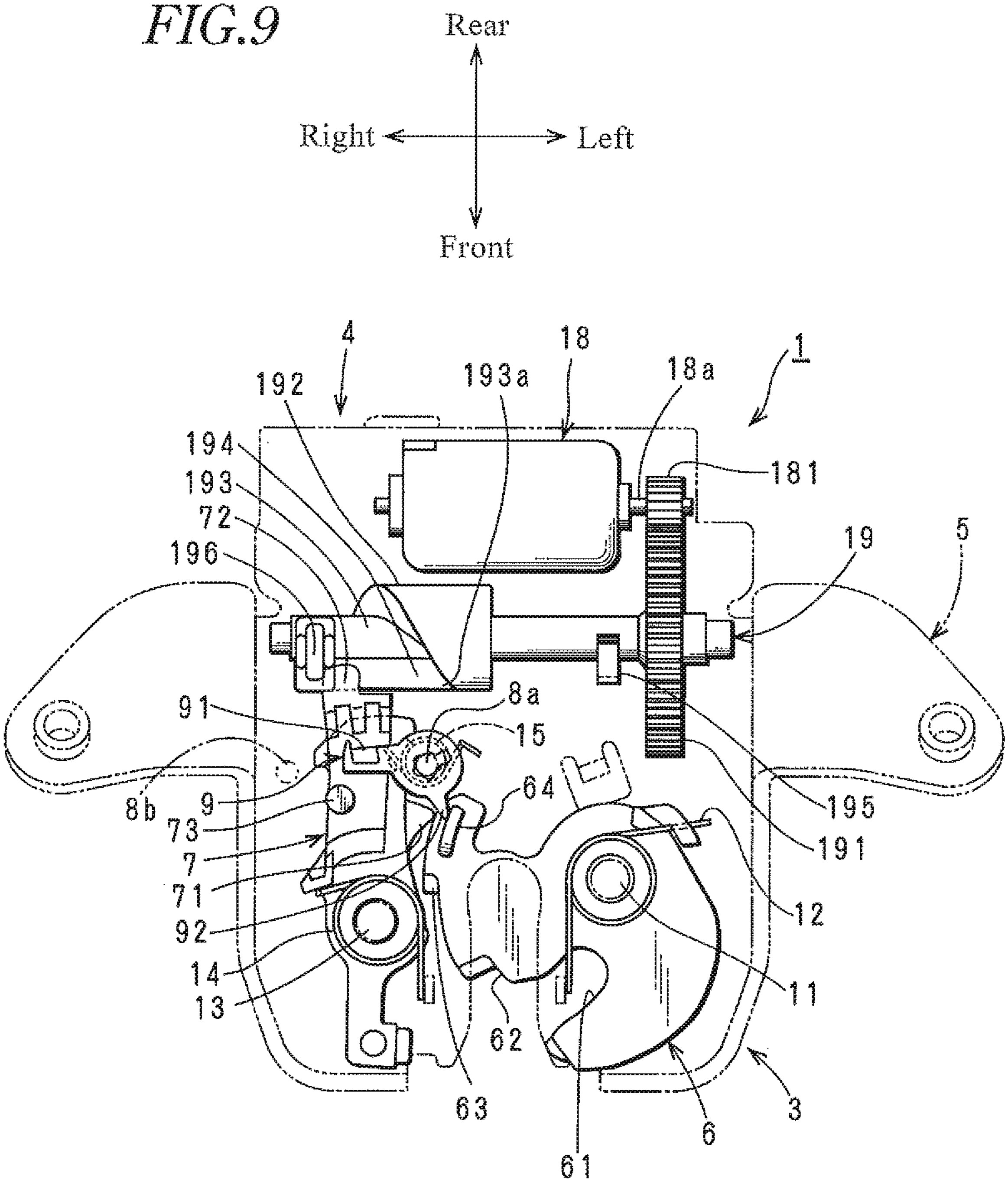
FIG. 9 is a planar view showing main parts in an unlatched state.

The latch 6 is supported on the left side of the striker entry groove 51 in the base 5 in a manner of being capable of pivotally movement by a predetermined angle by a latch shaft 11 oriented in upward and downward directions, and biased in a counterclockwise direction (unlatch direction) in a planar view in FIGS. 7 to 9 in particular by an biasing force of a spring 12 wound around the latch shaft 11, so that the latch 6 can pivotally move from a latch position (position corresponding to a closed position of the rear door) in FIG. 7 by a predetermined angle in a counterclockwise direction to an unlatch position (position corresponding to an open position of the rear door) in FIG. 9, and in a direction reverse to the counterclockwise direction.

The latch 6 is provided with: an engagement groove 61 which can mesh with the striker 2 entering the striker entry groove 51 of the base 5 at the time of closing the rear door; as shown in FIGS. 7 to 9 in particular, a full latch engagement part 62 and a half latch engagement part 63 that are provided in an outer peripheral edge of the latch 6 itself; and a block release part 64 located on an upper surface near an outer periphery of the latch 6 itself and having an approximately arched shape in a planar view and protruding upward by a predetermined amount.

The ratchet 7 is supported on the right side of the striker entry groove 51 in the base 5 in a manner of being capable of pivotally moving by a predetermined angle by a ratchet shaft 13 oriented in upward and downward directions, and biased in a clockwise direction (engagement direction) in a planar view by a spring 14 wound around a ratchet shaft 13, so that the ratchet 7 can pivotally move from an engagement position in FIG. 7 by a predetermined angle in a counterclockwise direction (release direction) to a release position shown in FIG. 8, and in a direction reverse to the counterclockwise direction.

In the ratchet 7, there are provided: a claw part 71 capable of selectively engaging with the full latch engagement part 62 or the half latch engagement part 63 of the latch 6; an operated part 72 extending backward, namely, in a direction oriented toward the actuating member 19; and a block part 73 being on an upper surface of the ratchet 7 itself and protruding upward by a predetermined amount.

At the engagement position of the ratchet 7 in FIG. 7, the claw part 71 of the ratchet 7 engages with the full latch engagement part 62 of the latch 6 in a state of engaging with the striker 2 by the biasing force of the spring 14, thereby holding the latch 6 at the latch position (corresponding to a closed position of the rear door), engages with the half latch engagement part 63 of the latch 6 to hold the latch 6 at the half latch position (corresponding to a door-ajar position of the rear door), and, at the release position of the ratchet 7 in FIG. 8, disengages from the full latch engagement part 62 or the half latch engagement part 63, thereby allowing the latch 6 to pivotally move to the unlatch position, so that the rear door can be opened.

The block part 73 penetrates the meshing cover 8 to be exposed outside the meshing cover 8, so that the ratchet 7 can be manually operated and disengaged in case of an emergency (for example, in a case where the motor 18 becomes inoperable due to a failure of an electrical system). Further, in the present embodiment, as is understandable from FIG. 2, the ratchet 7 can also be manually operated and disengaged in case of an emergency such that a separately prepared knob part 16 is inserted into a long hole 8*c* provided in the meshing cover 8 and inserted into an end 74 of the ratchet 7 to manually operate the knob part 16. As described above, there are the two manual operation parts (block part 73 and knob part 16), so that one of the two manual operation parts which is easily operable can be selected and operated for every vehicle type.

As to a latch shaft 11 and a ratchet shaft 13, their lower ends are supported non-rotatably on the base 5 and their upper ends penetrate the meshing cover 8 to be non-rotatably adhered to the sub-plate 10. In this manner, the support strength for the latch shaft 11 and the ratchet shaft 13 can be enhanced.

The memory lever 9 is located at a position overlapping with an upper side of the ratchet 7 and supported in a downward shaft part 8*a* formed integrally on a reverse surface side (lower surface side) of the meshing cover 8. The memory lever 9 is also biased by the spring 15 in a counterclockwise direction in a planar view and held at a wait position where, as shown in FIG. 7, when the latch 6 is at the latch position and the ratchet 7 is at the engagement position, a first arm part 91 provided on the right side of the memory lever 9 itself is in contact with the block part 73 of the ratchet 7 from the rear side and pivotal movement in a counterclockwise direction is inhibited. The memory lever 9 is disposed at a position overlapping with the upper side of the ratchet 7, thereby making it possible to reduce the horizontal projection area of the casing in the regions in which the various components are disposed in comparison with a case of disposing the memory lever 9 on the same plane as the ratchet 7.

As shown in FIG. 8, if the ratchet 7 moves to the release position and the latch 6 is at the latch position, the claw part 71 of the ratchet 7 disengages from the full latch engagement part 62, and the block part 73 of the ratchet 7 disengages from the first arm part 91 of the memory lever 9. In this manner, the memory lever 9 is biased by the spring 15 and moves to the block position shown in FIG. 8 after pivotally moving from the wait position in a counterclockwise direction by a predetermined angle.

If the memory lever 9 moves to the block position, the tip of the first arm part 91 of the memory lever 9 enters a movement trajectory of the block part 73 of the ratchet 7, so that the block part 73 becomes capable of being in contact with the tip of the first arm part 91 from the right side. Due to this, as long as the memory lever 9 is at the block position, the ratchet 7 having moved to the release position once is prevented from pivotally moving in the engagement direction and is held at the release position until the latch 6 moves to the unlatch position.

As shown in FIG. 9, if the latch 6 moves to the unlatch position, a block release part 64 of the latch 6 is in contact with the second arm part 92 provided in the memory lever 9 from the rear side. In this manner, against the biasing force of the spring 15, the memory lever 9 moves to the unblock position shown in FIG. 9 after pivotally moving from the block position in a clockwise direction by a predetermined angle. If the memory lever 9 moves to the unblock position, the tip of the first arm part 91 of the memory lever 9 retreats outside the movement trajectory of the block part 73 of the ratchet 7, so that the ratchet 7 can move the engagement position.

The meshing cover 8 is fixed to the base 5 such that all the movable elements such as the latch 6 and the ratchet 7, etc. configuring the meshing unit 3 are covered from above. In this manner, as is understandable from FIG. 5 in particular, all the movable elements such as the latch 6, the ratchet 7, and the memory lever 9, etc. are arranged within the horizontal projection area of the casing (base 5 and meshing cover 8) and accommodated in an accommodation space between the base 5 and the meshing cover 8. However, as is understandable from FIG. 3, the operated part 72 of the ratchet 7 protrudes more backward than the rear end of the meshing cover 8, so that, at the time of assembling the actuator unit 4 to the meshing unit 3, the operated part 72 of the ratchet 7 can easily engage with the actuating member 19 of the actuator unit 4.

(Actuator Unit 4)

As described above, the actuator unit 4 includes: the motor cover 17 that is fixed to the rear upper surface of the base 5 of the meshing unit 3 and is made from a synthetic resin; the motor 18 and the actuating member 19 that are supported within the motor cover 17; the detection switch 20 fixed to the bottom of the motor cover 17; and the connector 21 provided in the upper part of the motor cover 17.

Figure 4:
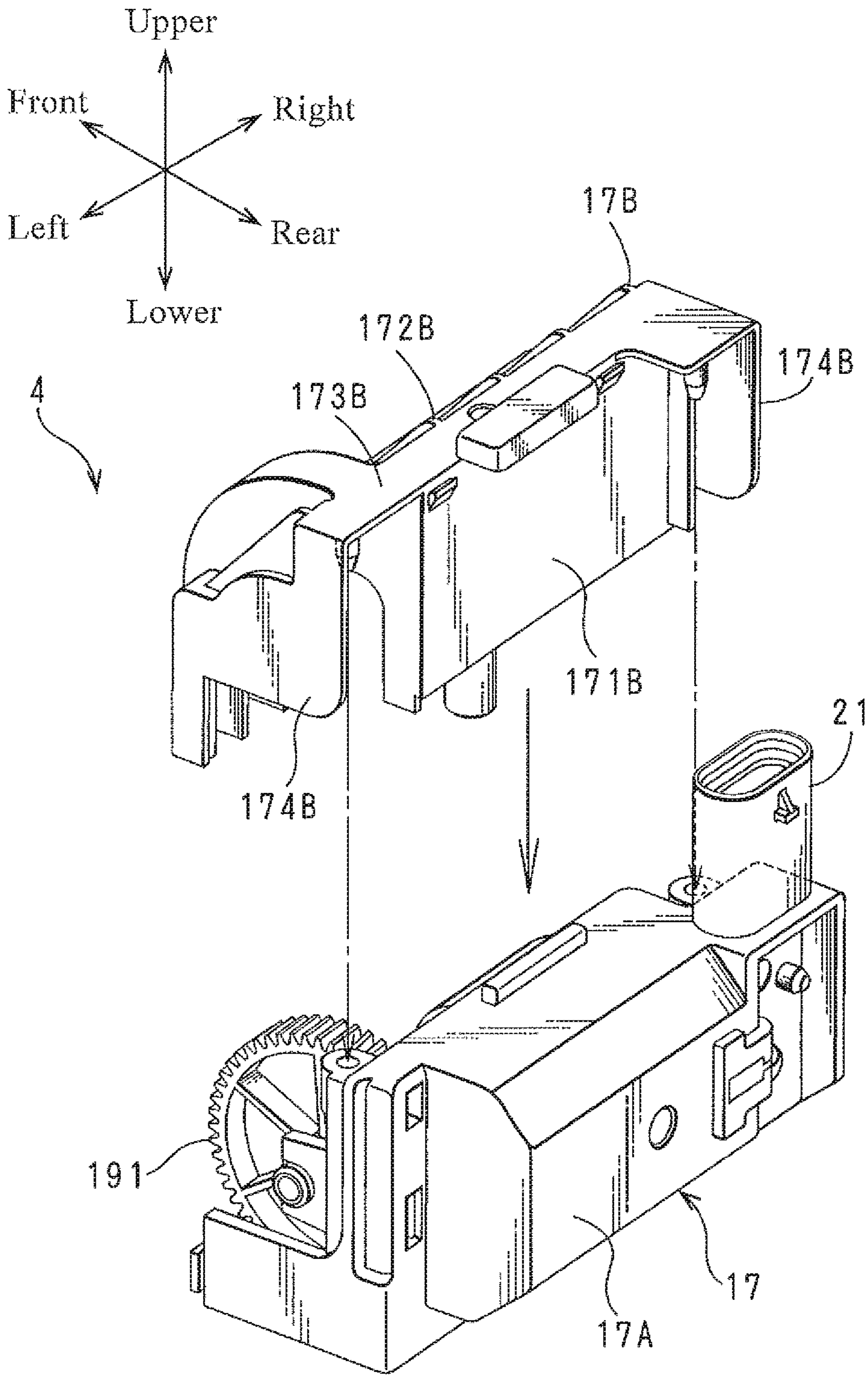
FIG. 4 is an exploded view showing the vehicle door lock device seen from a diagonally backward direction of an actuator unit.

As is understandable from FIGS. 2 and 4 in particular, the motor cover 17 has a box shape which opens in front and includes a first cover 17A fixed to the rear upper surface of the base 5 and a second cover 17B fixed to the front part of the first cover 17A such that the opening of the first cover 17A is closed.

The first cover 17A and the second cover 17B are fixed to the base 5 by the bolt 22. The second cover 17B has a shield part 171B for blocking the opening of the first cover 17A from the front.

In a first space region 17C (see FIGS. 14 and 15) covered by the first cover 17A and the shield part 171B of the second cover 17B, the motor 18 is arranged. This can prevent rainwater from entering the first space region 17C in which the motor 18 as an electric component is arranged, thereby preventing rainwater from adhering to the motor 18.

The actuating member 19 is provided in a pivotally movable manner in a second space region 17D (see FIGS. 14 to 16) covered by the shield part 171B in the second cover 17B, a front part 172B facing the shield part 171B, an upper part 173B connecting upper ends of the shield part 171B and the front part 172B, side parts 174B provided on both sides of the shield part 171B and the front part 172B, and a bottom 171A of the first cover 17A.

The casing according to the present embodiment is formed from the base 5 and the meshing cover 8 of the meshing unit 3 as well as the motor cover 17 of the actuator unit 4. The motor cover 17 may be realized by integrating the first cover 17A and the second cover 17B.

The motor 18 is supported within the first cover 17A, so that the rotary shaft 18*a* is oriented in left and right directions. A pinion gear 181 is fastened to the left end of the rotary shaft 18*a*. As described below, the pinion gear 181 engages with a gear part 191 of the actuating member 19 to decelerate the motive power of the motor 18 and to transmit the motive power of the motor 18 to the actuating member 19.

Figure 13:
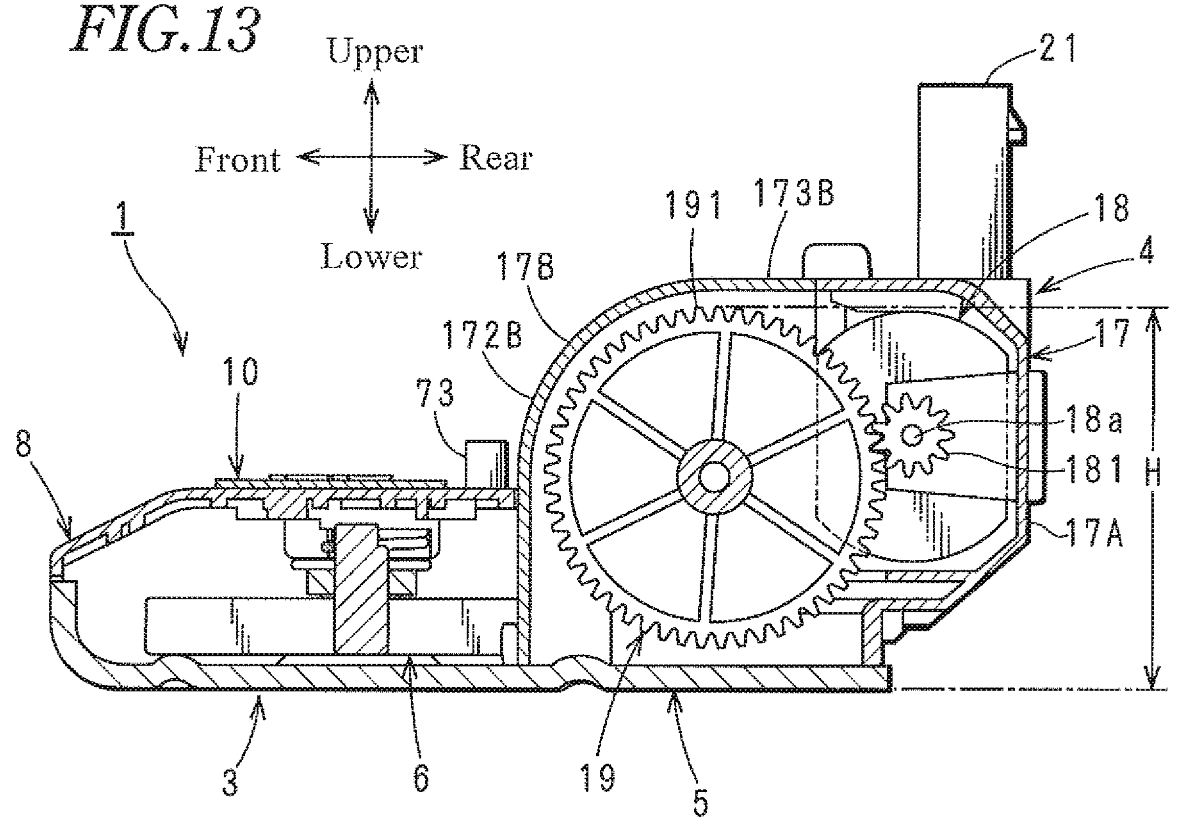
FIG. 13 is a sectional view taken along a XIII-XIII line in FIG. 5.

The actuating member 19 is supported within the second cover 17B in a pivotally movable manner, so that the rotation axial direction is oriented in the left and right directions (direction parallel to the rotation axial direction of the rotary shaft 18*a* of the motor 18) and the actuating member 19 is located between the motor 18 and the latch 6, the ratchet 7, and has one rotation in one direction (arrow direction in FIG. 2 and a counterclockwise direction in a side view in FIG. 13) from the below-mentioned neutral position by the motive power of the motor 18 obtained by the large-diameter gear part 191 provided near the left end engaging with the pinion gear 181 of the motor 18.

The gear part 191 is on the side of the latch 6 and is arranged outside the movement range of the latch 6. In this manner, the actuating member 19 can be arranged at a position near a portion where the latch 6 (full latch engagement part 62 or half latch engagement part 63) and the ratchet 7 (claw part 71) engage. Further, as is understandable from FIG. 13, among the movable elements including the latch 6, the ratchet 7, the motor 18, the actuating member 19, and the gear part 191, a vertical dimension H of a part in which an uppermost part of the gear part 191 is located is maximized. This configuration can reduce the size in the thickness direction of the device.

Figure 14:
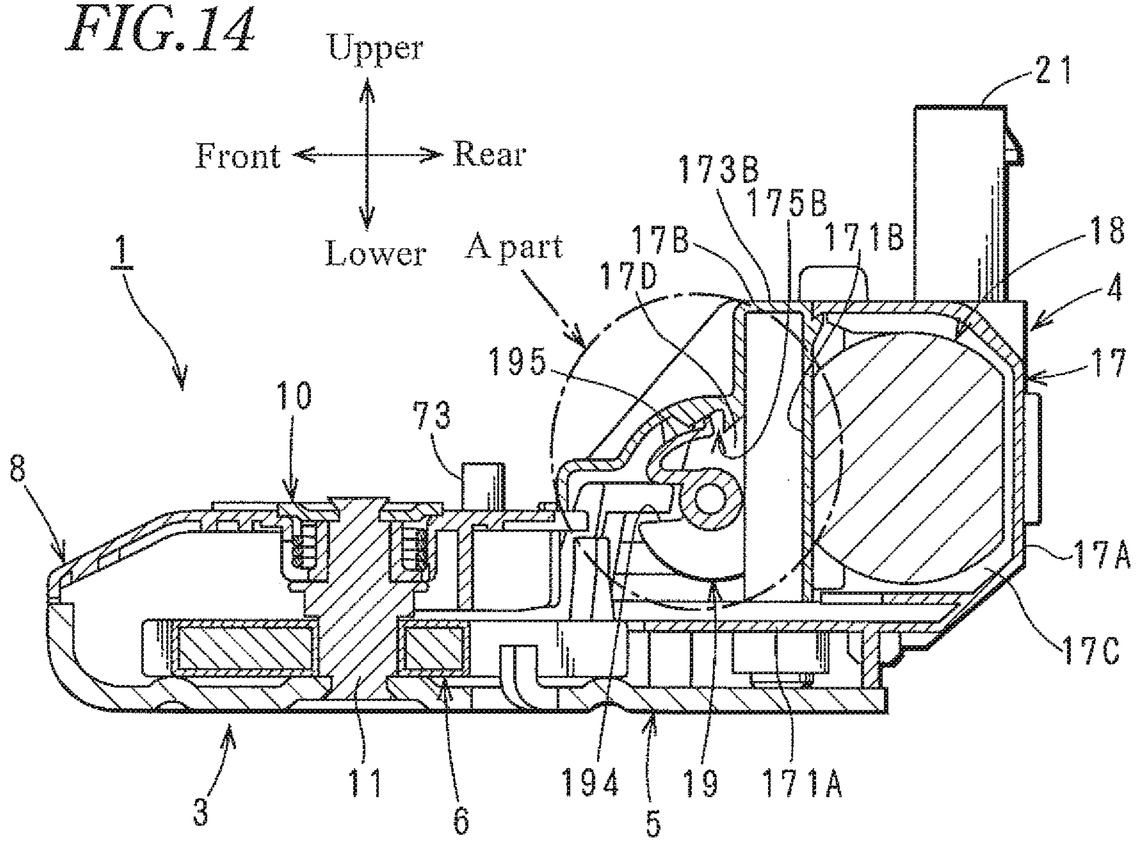
FIG. 14 is a sectional view taken along a XIV-XIV line in FIG. 5.
Figure 15:
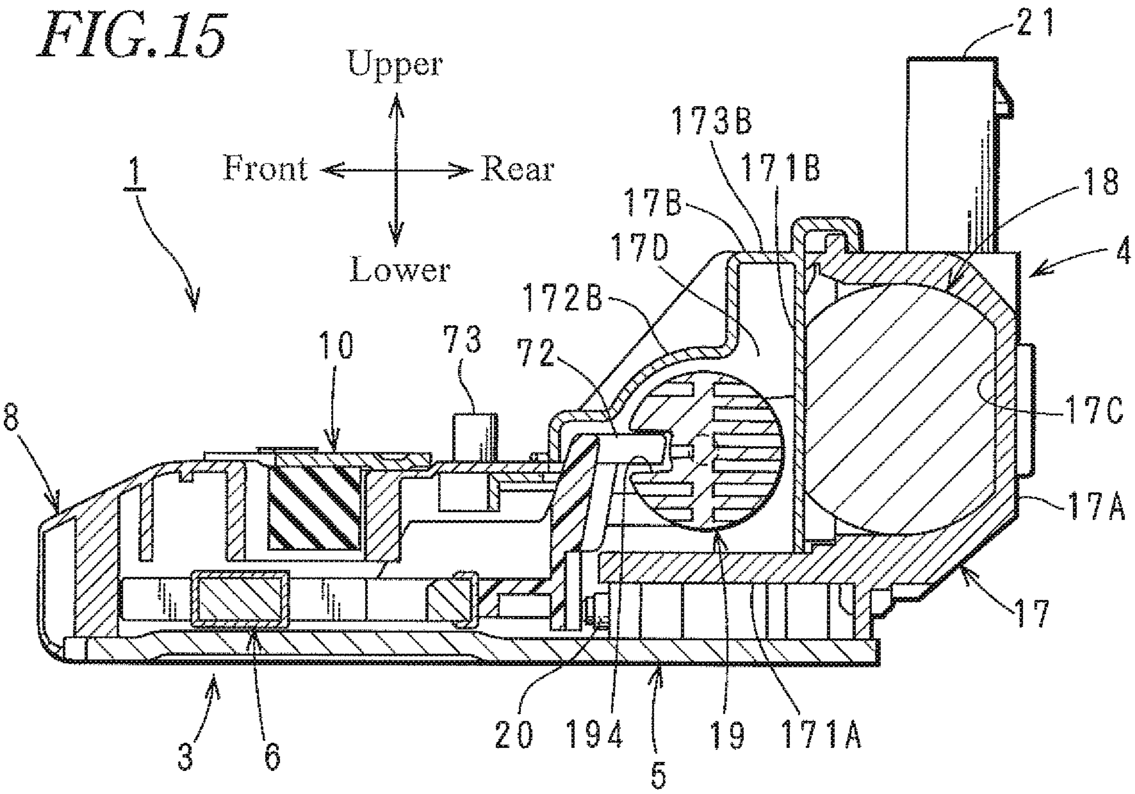
FIG. 15 is a sectional view taken along a XV-XV line in FIG. 5.

In addition to the gear part 191, the actuating member 19 further includes: a spiral groove line part 193 in a cylindrical outer peripheral part 192; a slit 194 extending in a rotation axial direction; an elastic part 195 being approximately V-shaped in a side view in FIG. 14; and a stopped part 196 located near the right end and protruding radially from the outer peripheral surface.

Figure 10:
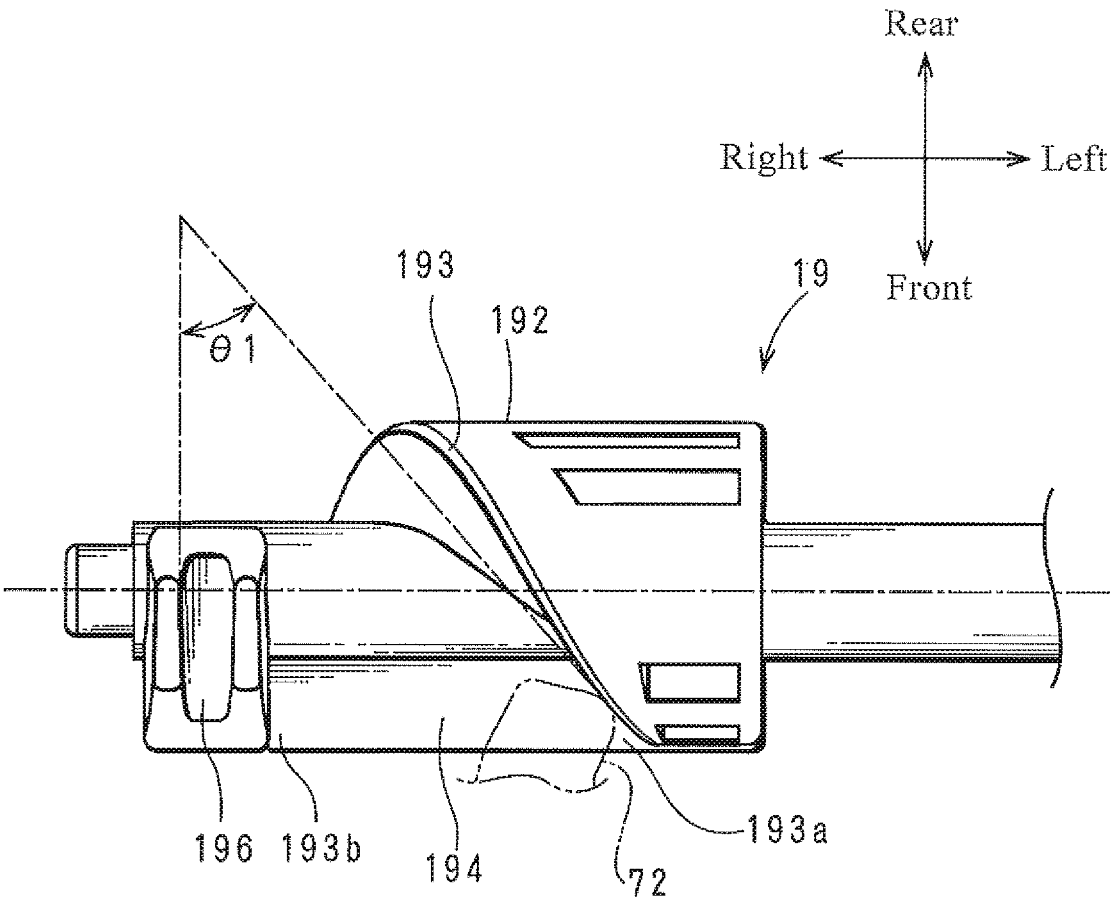
FIG. 10 is an enlarged planar view showing main parts when an actuating member is at a neutral position.
Figure 11:
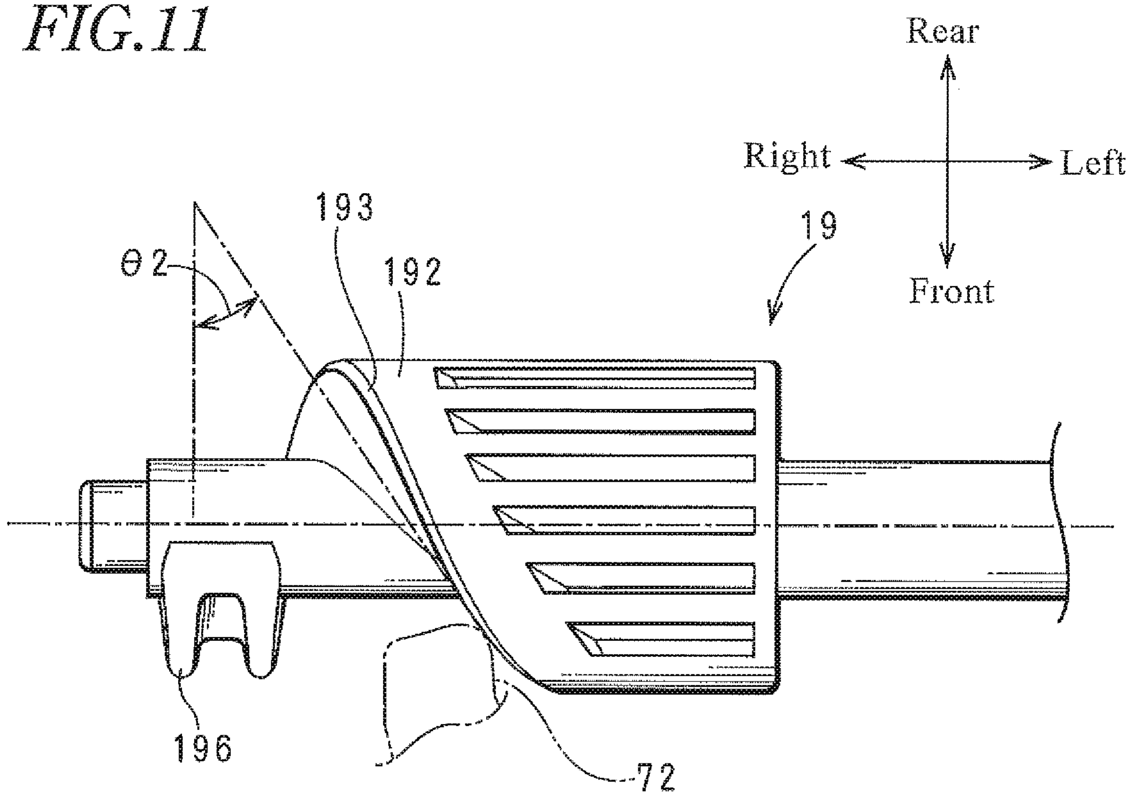
FIG. 11 is an enlarged planar view showing main parts when an actuating member is rotated in its one direction by a predetermined angle.
Figure 12:
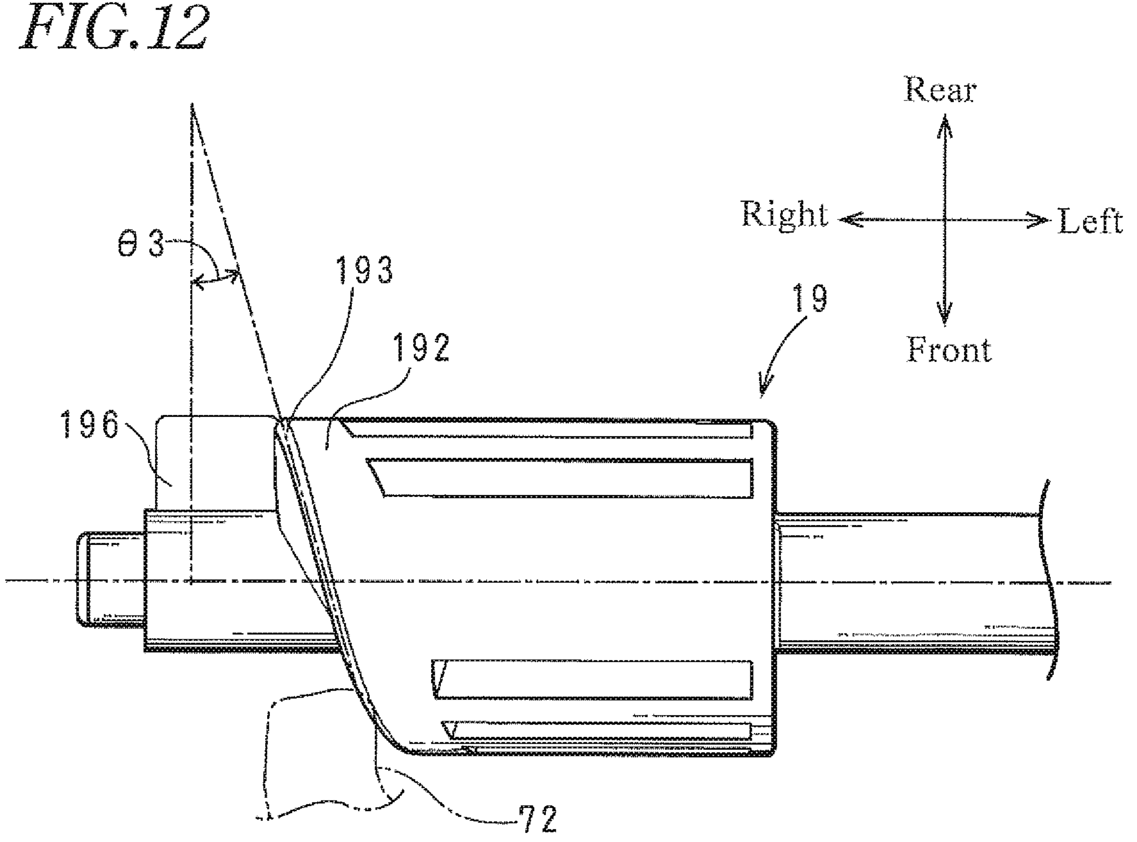
FIG. 12 is an enlarged planar view showing main parts when an actuating member is rotated in one direction further than in FIG. 11.

The groove line part 193 is provided helically at less than one circumference around the outer peripheral part 192 of the actuating member 19. The operated part 72 of the ratchet 7 engages with the groove line part 193. In this manner, the actuating member 19 undergoes one rotation in one direction by the motive power of the motor 18, thereby moving rightward the operated part 72 of the ratchet 7 engaging with the groove line part 193 of the actuating member 19. In this manner, the ratchet 7 pivotally moves from the engagement position in the release direction to the release position. Preferably, when the ratchet 7 release-moves in conjunction with the rotation of the actuating member 19, a lead angle of the spiral groove line part 193 in the actuating member 19 is varied such that, the farther the ratchet 7 moves toward the release position, the lower the release movement speed of the ratchet 7 becomes. Concretely, as shown in FIG. 10, when the actuating member 19 is at the neutral position and the lead angle of the groove line part 193 in the portion with which the operated part 72 of the ratchet 7 engages is θ1, as shown in FIG. 11, the lead angle of the groove line part 193 in the portion with which the operated part 72 of the ratchet 7 engages becomes θ2 which is acuter than θ1, when the actuating member 19 is at an intermediate position (position after rotation of approximately 100 degrees from the neutral position in one direction). As shown in FIG. 12, when the actuating member 19 further rotates in one direction, the lead angle of the groove line part 193 in the portion with which the operated part 72 of the ratchet 7 engages is set to θ3 which is acuter than θ2. Namely, the lead angle is set such that θ1>θ2>θ3. The lead angle means an angle made by a tangential line at the point where the operated part 72 engages with the groove line part 193 and a line perpendicular to the rotary shaft of the actuating member 19.

As described above, the further the actuating member 19 rotates from the neutral position in one direction, the acuter the lead angle of the groove line part 193 is made, so that, even if the rotation speed of the motor 18 is constant, the movement of the ratchet 7 becomes gradually lower and therefore the tracking performance of the operated part 72 of the ratchet 7 for the groove line part 193 of the actuating member 19 is improved. This can reduce a contact sound at the time of stopping the actuating member 19 at the neutral position and a contact sound at the time of stopping the ratchet 7 by causing the ratchet 7 to come into contact with a stopper part 8*b* provided in the meshing cover 8 at the release position of the ratchet 7. Further, the rebound at the time of stopping the ratchet 7 at a position exceeding the release position can be suppressed and therefore the movement of the memory lever 9 to the block position is ensured.

Figure 18:
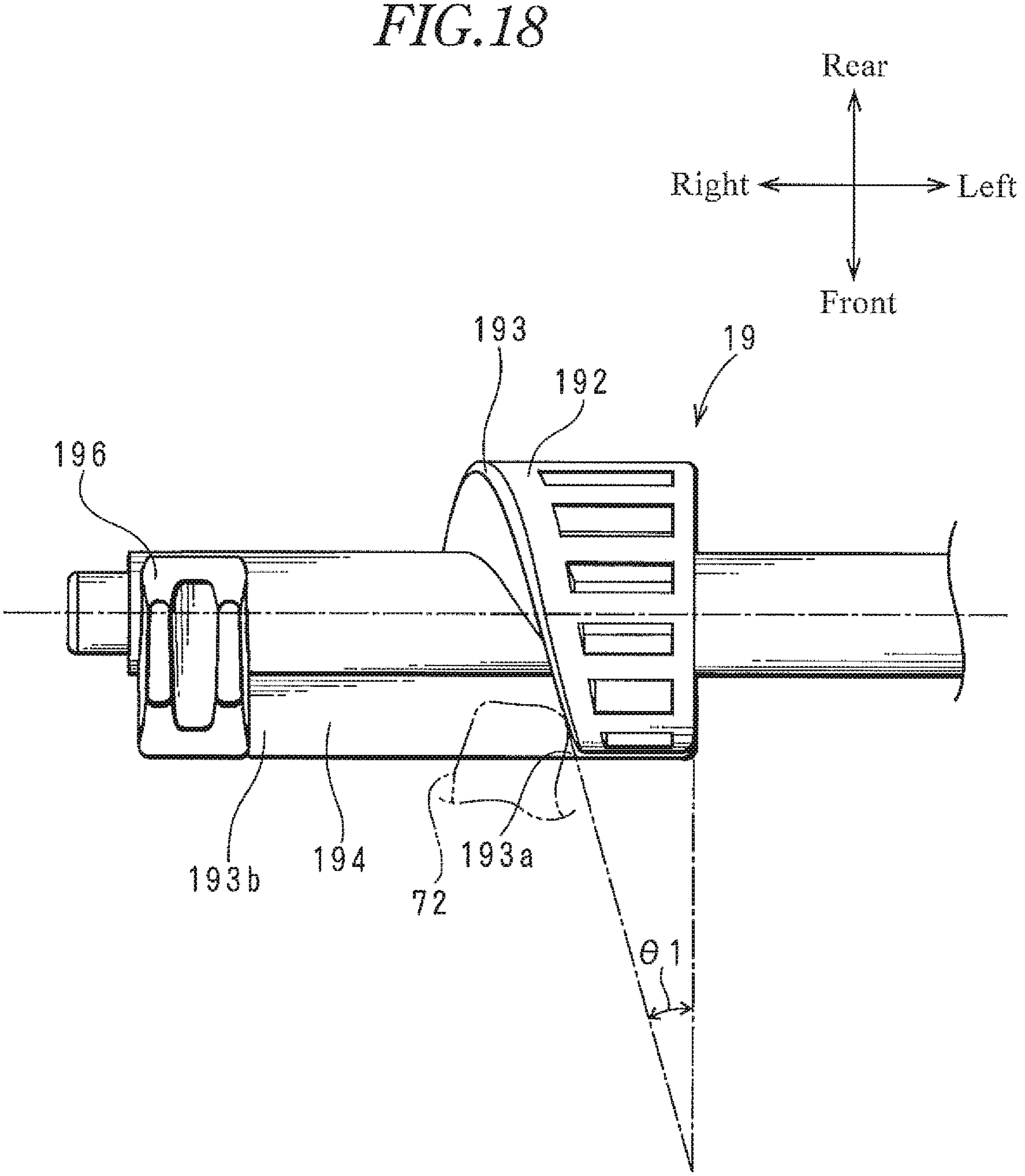

Further, as the other embodiment of the present invention, as shown in FIGS. 18 to 20, the lead angle of the spiral groove line part 193 in the actuating member 19 may be set such that the lead angle θ1 is an acute angle when the actuating member 19 is at the neutral position and the angle becomes obtuser toward the lead angle θ3 at the position on the release side of the ratchet 7, namely, θ1<θ2<θ3.

The lead angle θ1 is made acuter when the actuating member 19 is at the neutral position, so that the movement speed decreases when the ratchet 7 starts to move. Therefore, even if the rotation speed of the motor 18 is constant, a torque can be increased when the ratchet 7 starts to move and, even if an operation load of the ratchet 7 is required for vehicles having a door that is heavy or a door that has a large seal reaction force, the ratchet 7 can be operated without fail.

As a further embodiment of the present invention, the lead angle may be set such that the lead angle θ1 is an acute angle when the actuating member 19 is at the neutral position, the angle is made obtuser toward the lead angle θ2 at the intermediate position of the actuating member 19, and the angle is further modified to be an acuter angle toward the lead angle θ3 from the intermediate position of the actuating member to the position on the release side of the ratchet, namely, θ1<θ2>θ3.

By performing the above setting, the torque is increased when the ratchet 7 starts to move, while the movement of the ratchet 7 at the release position is slowed, so that the contact sound can be reduced.

The slit 194 extends in the axial direction of the actuating member 19 so as to connect a starting end 193*a* with a terminal end 193*b* in the groove line part 193. If the actuating member 19 is held at the neutral position (position in which the slit 194 has an attitude of being oriented forward and accords with the track of the operated part 72 in the ratchet 7) shown in FIGS. 7 to 9 and 13 to 16, the operated part 72 of the ratchet 7 can freely move in the left and right directions within the slit 194 without interfering with other elements.

The elastic part 195 is in a shaft outer periphery of the actuating member 19, is provided between the gear part 191 and the starting end 193*a* of the groove line part 193, and is approximately V-shaped in a side view. Therefore, it is possible to have elastic deformation in a normal direction (direction perpendicular to a tangential line at one point of an arched track of the elastic part 195 with the rotation of the actuating member 19).

Figure 17:
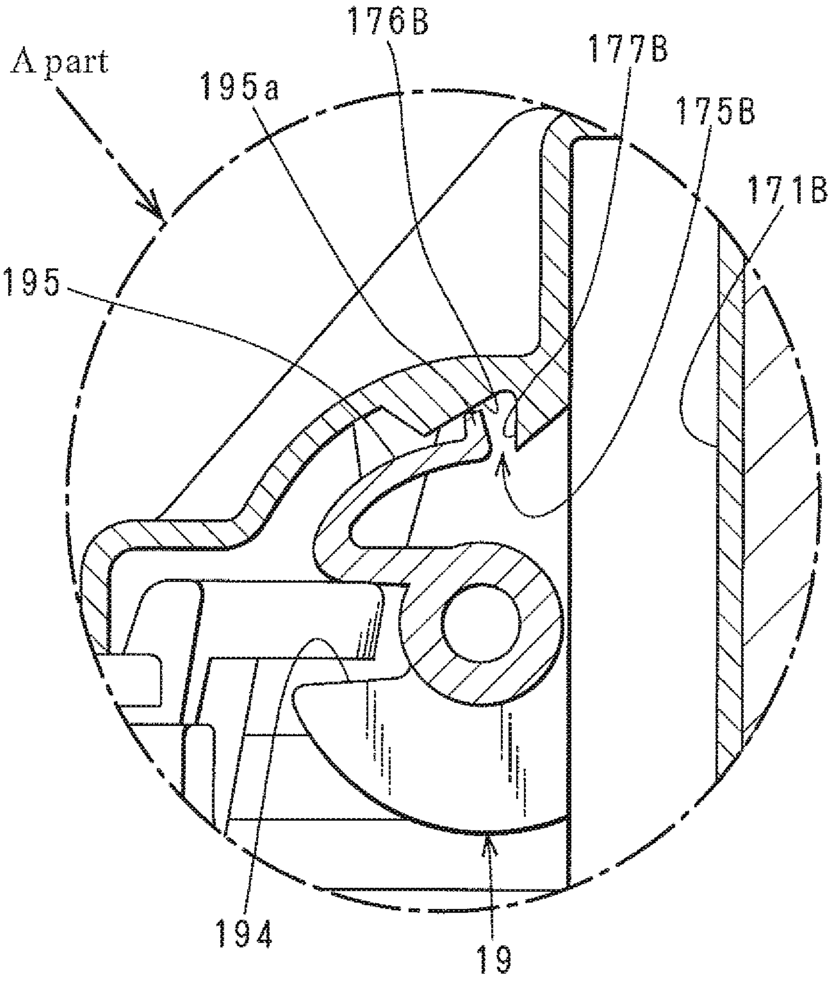
FIG. 17 is an enlarged view showing Part A in FIG. 14.

As shown in FIGS. 14 and 17, the tip 195*a* of the elastic part 195 fits into an engagement groove 175B provided on the reverse face of the second cover 17B when the actuating member 19 is at the neutral position and holds the actuating member 19 at the neutral position. Meanwhile, when the actuating member 19 is driven by the motor 18 and rotates from the neutral position in one direction (in the release direction and in the counterclockwise direction in FIGS. 14 and 17), the tip 195*a* gets out from the engagement groove 175B while the elastic part 195 elastically deforms in a normal direction. Then, when the actuating member 19 has one rotation in one direction, the stopped part 196 is in contact with the upper surface of the operated part 72 of the ratchet 7, so that the actuating member 19 stops at the neutral position, and the tip 195*a* of the elastic part 195 having gotten out from the engagement groove 175B fits again into the engagement groove 175B and holds the actuating member 19 at the neutral position.

In the state in which the tip 195*a* of the elastic part 195 fits into the engagement groove 175B, rattling within the motor cover 17 in the actuating member 19 can be prevented.

In a mode in which the elastic part 195 fits into the engagement groove 175B, thereby holding the actuating member 19 at the neutral position, the tip 195*a* of the elastic part 195 may be in contact with the bottom of the engagement groove 175B to elastically hold the actuating member 19 by an elastic force of the elastic part 195 or may hold the actuating member 19 in a state in which the tip 195*a* of the elastic part 195 fits loosely without being in contact with the bottom of the engagement groove 175B.

Preferably, as is understandable from an enlarged view in FIG. 17, the engagement groove 175B includes an inclined part 176B gently inclined in the counterclockwise direction and a prevention part 177B standing up approximately perpendicularly from the deepest part at an end in the clockwise direction. If the actuating member 19 rotates from the neutral position in one direction (counterclockwise direction in FIG. 17), the inclined part 176B allows the tip 195*a* of the elastic part 195 to slide and get out from the engagement groove 175B. The tip 195*a* of the elastic part 195 comes into contact with the prevention part 177B to thereby prevent the actuating member 19 from rotating from the neutral position in another direction (clockwise direction in FIG. 17) reverse to the one direction.

Figure 16:
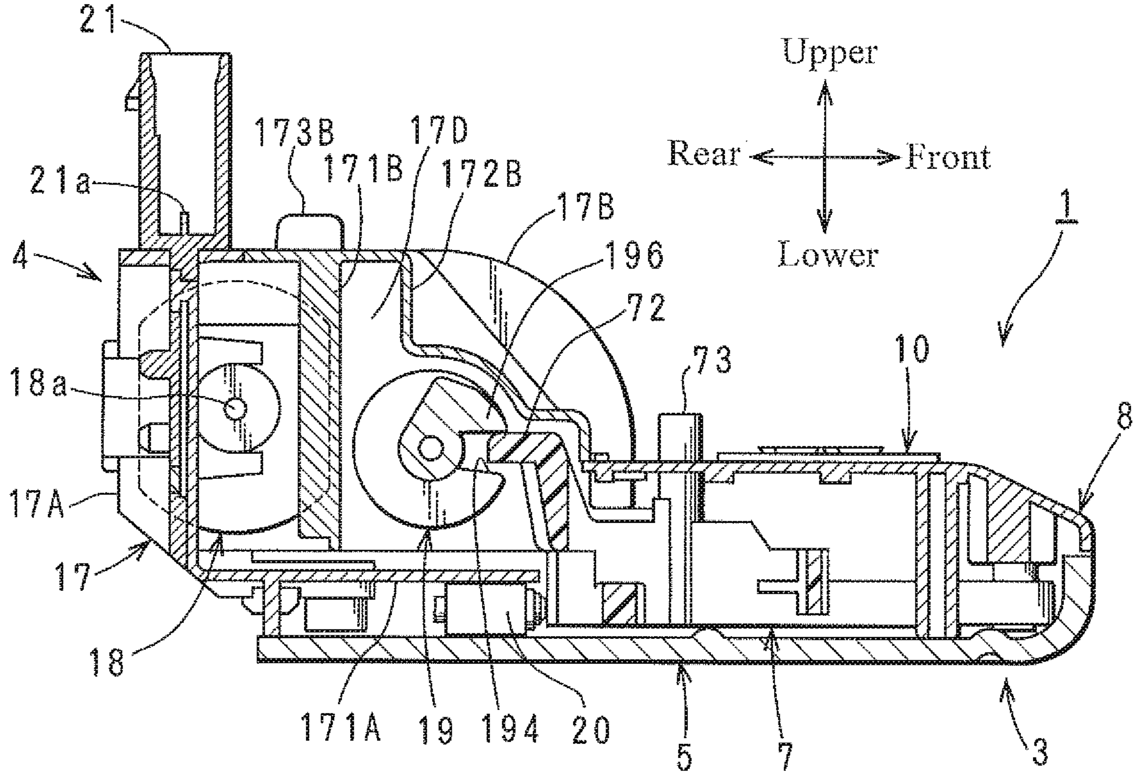
FIG. 16 is a sectional view taken along a XVI-XVI line in FIG. 5.

When the actuating member 19 rotates by the motive power of the motor 18 in one direction and moves the ratchet 7 to the release position, the stopped part 196 is in contact with the upper surface of the operated part 72 of the ratchet 7 to stop the actuating member 19 at the neutral position as shown in FIG. 16 in particular. In the manner as described above, the return spring as in the prior art is not required, and thus the configuration is simplified and it is not necessary to rotate the actuating member 19 against the biasing force of the return spring as in the prior art. Therefore, the ratchet 7 can be operated in the release direction by a small motor 18 having a small output.

In the above-described configuration, the following state is considered to occur. Namely, when the stopped part 196 of the actuating member 19 is in contact with the upper surface of the operated part 72 of the ratchet 7, the actuating member 19 pauses at the neutral position, while the actuating member 19 rebounds in another direction due to reaction caused by the stopped part 196 being in contact with the operated part 72, and stops at a position deviating from the neutral position. If the above state occurs, the position of the slit 194 in the actuating member 19 deviates from the normal position and the operated part 72 of the ratchet 7 cannot move in the slit 194 of the actuating member 19, so that an operation defect may be caused. However, in the present embodiment, as described above, when the actuating member 19 stops at the neutral position, the elastic part 195 fitting into the engagement groove 175B is in contact with the prevention part 177B of the engagement groove 175B, thereby preventing the actuating member 19 from rotating in another direction. Therefore, it is possible to prevent the above-described rebounding and to reliably stop the actuating member 19 at the neutral position.

As shown in FIG. 16 in particular, the detection switch 20 is arranged between the bottom 171A of the first cover 17A and the base 5, and, when the ratchet 7 is at a position other than in a state of engaging with the full latch engagement part 62 of the latch 6, the detection switch 20 is turned on partially in contact with the ratchet 7, thereby outputting a signal indicative of a non-engagement state of the ratchet 7.

The connector 21 is provided on the upper right surface of the first cover 17A by being oriented upward such that connection and disconnection directions of the electrically-conductive terminal of the connection-counterpart connector are oriented upward and downward. The electrically-conductive terminal 21*a* in the connector 21 is to be electrically connected to the motor 18 and the detection switch 20.

(Method for Assembling Vehicle Door Lock Device 1)

The vehicle door lock device 1 in the present embodiment is assembled based on the following procedure. In the first assembling process, as shown in FIG. 2, the latch 6 and the ratchet 7 are supported on the base 5 by the latch shaft 11 and the ratchet shaft 13, respectively, the springs 12, 14 are wound around the latch shaft 11 and the ratchet shaft 13, respectively, and the meshing cover 8 is fixed to the upper side of the base 5, whereby the assembly of the meshing unit 3 ends. The meshing cover 8 is fixed to the base 5 in a state in which the sub-plate 10 is fixed to the surface of the meshing cover 8 and the memory lever 9 and the spring 15 are supported beforehand on the back side of the meshing cover 8.

In the second assembling process, the motor 18, the actuating member 19, and the electrically-conductive terminals 21*a* are supported within the motor cover 17, and the detection switch 20 is arranged on the lower surface side of the bottom 171A of the first cover 17A in the motor cover 17, whereby the assembly of the actuator unit 4 ends.

Figure 3:
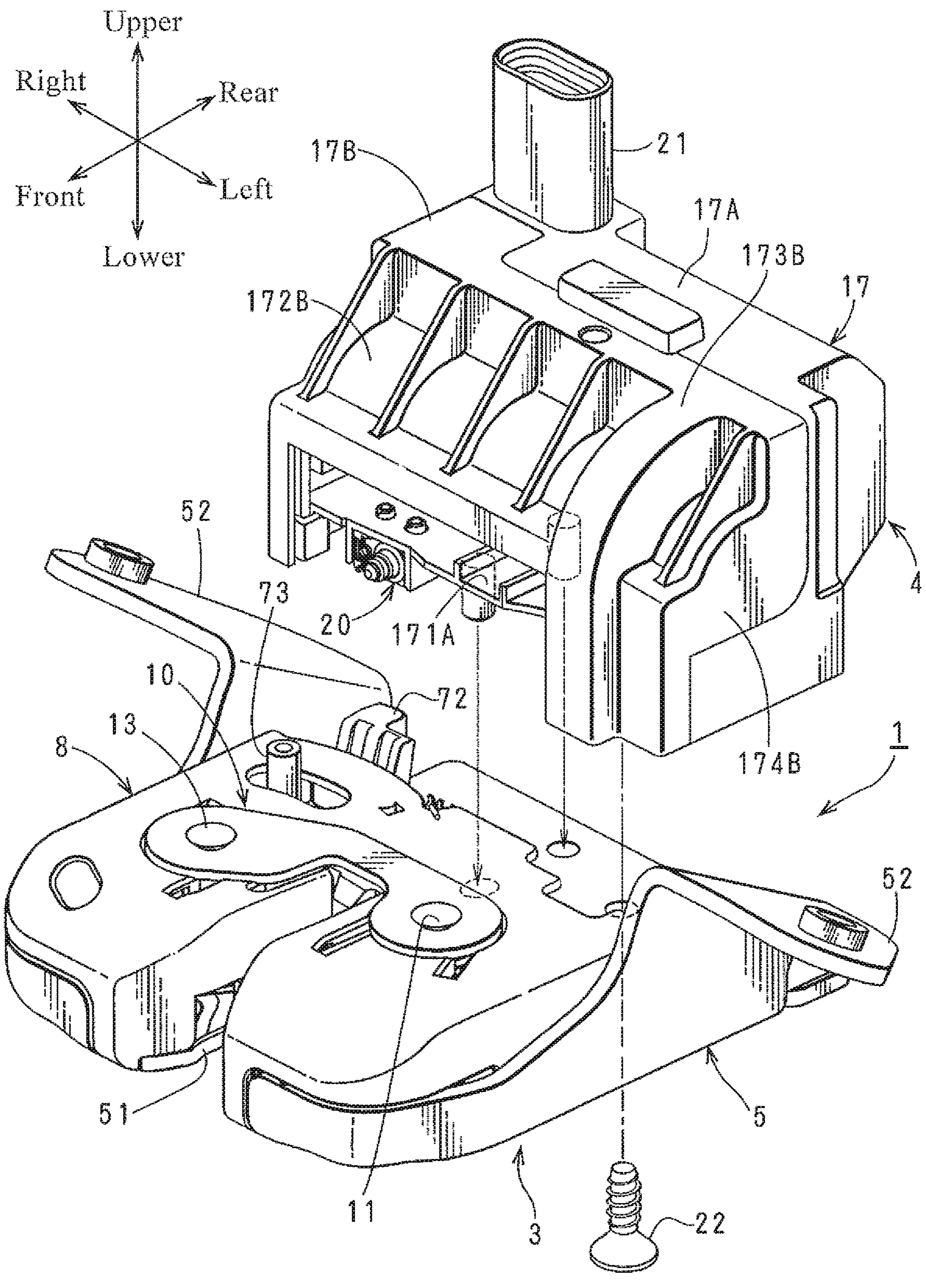
FIG. 3 is a perspective view showing the vehicle door lock device in a state before assembling an actuator unit to an engagement unit.

In the third assembling process, after the first and second assembling processes, as shown in FIG. 3, the vehicle door lock device 1 is configured such that the bottom 171A of the motor cover 17 of the actuator unit 4 is mounted, from the upper side, on the base 5 of the meshing unit 3 and fixed by the bolt 22.

(Whole Structure of Vehicle Door Lock Device 1)

Figure 5:
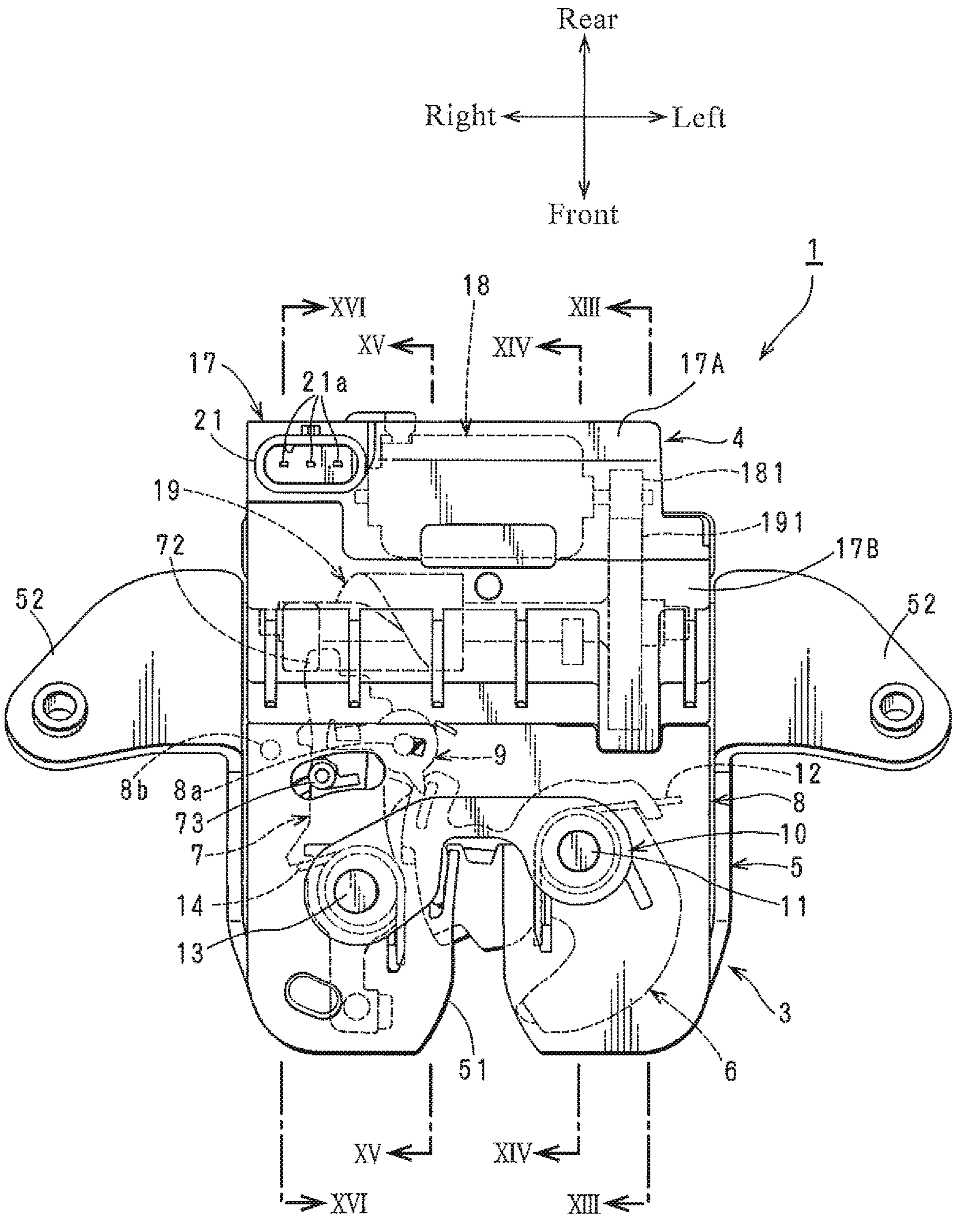
FIG. 5 is a planar view showing the vehicle door lock device in FIG. 1.
Figure 6:
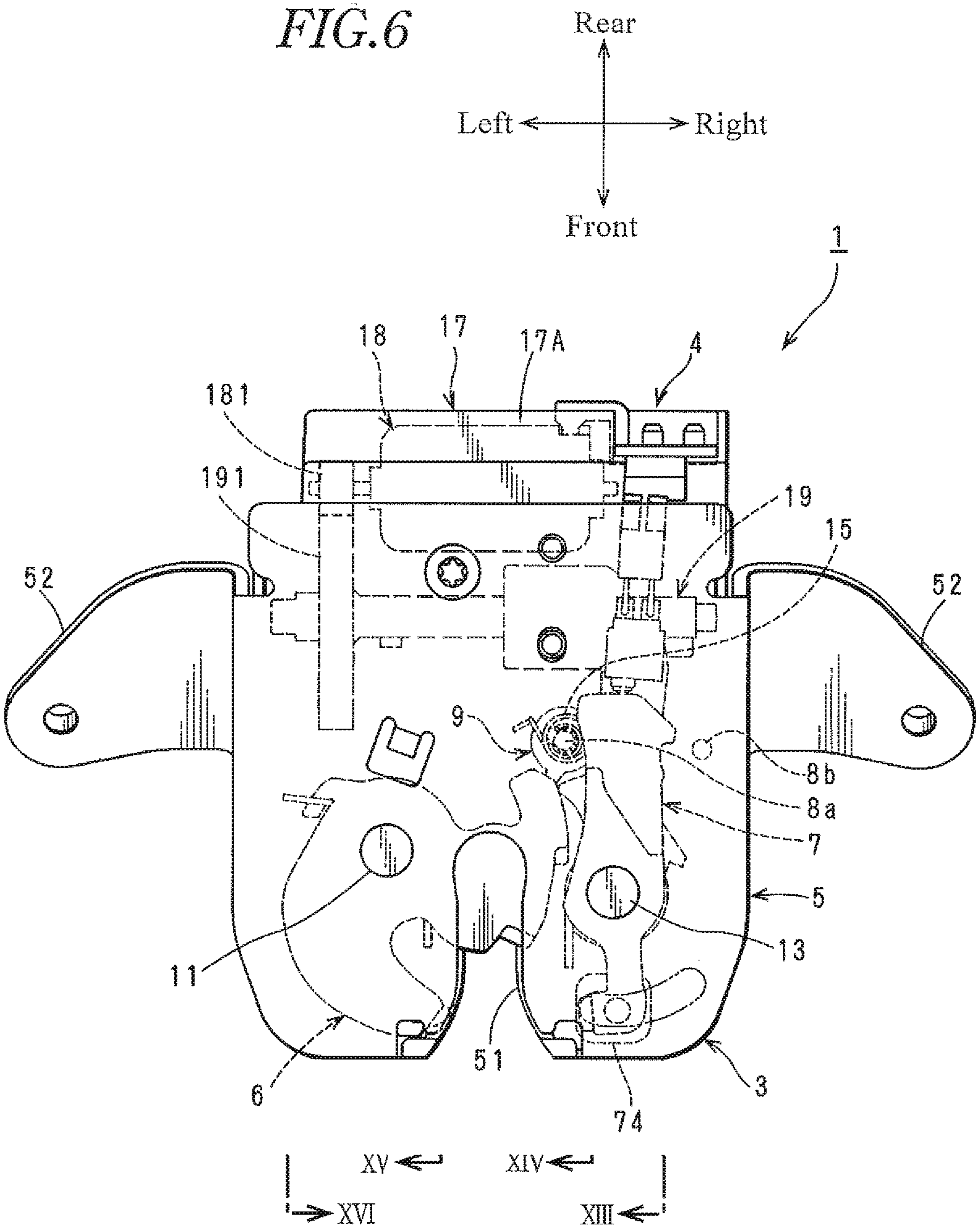
FIG. 6 is a bottom view showing the vehicle door lock device in FIG. 1.

The vehicle door lock device 1 is arranged within the casing such that the main movable elements such as the latch 6, the ratchet 7, the motor 18, and the actuating member 19, etc. mutually have the following positional relationship (see FIGS. 5 and 6). The casing according to the present embodiment indicates a casing formed from the base 5 as well as the meshing cover 8 and the motor cover 17 (the first cover 17A and the second cover 17B) fixed to the base 5. The latch 6 is supported by the latch shaft 11 oriented upward and downward on the left side of the striker entry groove 51 in the casing.

The ratchet 7 is supported in a pivotally movable manner by the ratchet shaft 13 oriented upward and downward on the right side of the striker entry groove 51 in the casing.

The motor 18 is in the rear of the latch 6 and the ratchet 7 as well as arranged in a rear part in the casing such that the rotary shaft 18*a* is oriented leftward and rightward and the pinion gear 181 fastened to the rotary shaft 18*a* is on the left side.

In order to allow the operated part 72 of the ratchet 7 to directly engage with the groove line part 193 of the actuating member 19, the actuating member 19 is supported in the casing in a pivotally movable manner in a planar view, so that the actuating member 19 is between latch 6, the ratchet 7 and the motor 18, the groove line part 193 is located on the right side (in which the ratchet 7 is located), and the rotation axial direction is oriented leftward and rightward.

In order to allow the actuating member 19 to, as much as possible, come close to the engagement part between the full latch engagement part 62 (or the half latch engagement part 63) of the latch 6 and the claw part 71 of the ratchet 7, the actuating member 19 is supported in the casing in a pivotally movable manner in a planar view, so that the actuating member 19 is between the motor 18 and a grouping of the latch 6 and the ratchet 7 and, the gear part 191 is on the side of the latch 6 and arranged outside the movement range of the latch 6, and the rotation axial direction is oriented leftward and rightward.

By realizing the above-described positional relationship among the respective movable elements, the actuating member 19 can be made closer to the portion where the latch 6 and the ratchet 7 engage. Therefore, by reducing the space for installing the respective movable elements, the respective movable elements can be arranged to be able to be within the horizontal projection area in the casing, and the vehicle door lock device 1 can be reduced in size.

Next, referring to FIGS. 7 to 9, an operation of the vehicle door lock device 1 will be explained.

(Operation when Rear Door is Opened)

In a state in which the rear door is closed, as shown in FIG. 7, the meshing unit 3 is at the latch position in which the latch 6 engages with the striker 2, and is in the latch state at the engagement position in which the ratchet 7 engages with the full latch engagement part 62 of the latch 6. The actuator unit 4 is in an initial state in which the actuating member 19 is at the neutral position and the operated part 72 of the ratchet 7 is located on the side of the starting end 193*a* of the groove line part 193 in the actuating member 19.

In a case where the motor 18 is driven based on an operation of an operation switch at the initial state of the actuator unit 4 when the meshing unit 3 is in the latched state, the rotation of the rotary shaft 18*a* of the motor 18 is transmitted to the actuating member 19 via the pinion gear 181 and the gear part 191. As a result, the actuating member 19 pivotally moves from the neutral position in one direction (release direction).

The actuating member 19 pivotally moves in one direction, thereby moving rightward the operated part 72 engaging with the groove line part 193 of the actuating member 19, so that the ratchet 7 pivotally moves in the release direction.

When the actuating member 19 has one rotation in one direction from the neutral position, as shown in FIG. 8, the ratchet 7 moves to the release position and the stopped part 196 of the actuating member 19 comes into contact with the upper surface of the operated part 72 of the ratchet 7, so that the actuating member 19 stops again at the neutral position. In this case, the lead angle of the groove line part 193 in the actuating member 19 is varied such that θ1>θ2>θ3 such that, the farther the ratchet 7 moves in the release direction, the lower the movement speed of the ratchet 7 becomes. Therefore, the movement of the ratchet 7 becomes gradually slower and the tracking performance of the operated part 72 of the ratchet 7 for the groove line part 193 of the actuating member 19 is improved, whereby it is possible to reduce the contact sound at the time of stopping the actuating member 19 at the neutral position and the contact sound at the time of stopping the ratchet 7 at the release position by coming into contact with the stopper part 8*b* provided in the meshing cover 8. Further, the rebound at the time of stopping the ratchet 7 at a position exceeding the release position of the ratchet 7 can be suppressed and therefore the movement of the memory lever 9 to the block position is ensured.

If the ratchet 7 moves to the release position, the claw part 71 of the ratchet 7 disengages from the full latch engagement part 62 of the latch 6 and this allows the latch 6 to pivotally move in the unlatch direction. Further, the block part 73 of the ratchet 7 withdraws from the movement trajectory of the first arm part 91 of the memory lever 9, so that the memory lever 9 moves to the block position by the biasing force of the spring 15.

When the state in FIG. 8 occurs, the rear door pops up due to, for example, the biasing force of the spring 12 acting on the latch 6 and the seal reaction force acting on the rear door, so that the latch 6 pivotally moves in the unlatch direction and the rear door can be opened. Then, as shown in FIG. 9, when the latch 6 pivotally moves to the unlatch position and the meshing unit 3 is put in the unlatched state, the block release part 64 of the latch 6 comes into contact with the second arm part 92 of the memory lever 9, so that the memory lever 9 is moved to the unblock position against the biasing force of the spring 15, thereby allowing the ratchet 7 to pivotally move in the engagement direction. If the meshing unit 3 is in the unlatched state shown in FIG. 9, the ratchet 7 is held at the position in which the claw part 71 is in contact with the outer peripheral surface of the latch 6 and, when the latch 6 pivotally moves in the latch direction, the ratchet 7 is held at the wait position in which the claw part 71 can selectively engage with the full latch engagement part 62 or the half latch engagement part 63.

Further, in an environment in which, for example, it is snowing and a vehicle is covered with snow, the following state occurs in a certain case. Namely, as shown in FIG. 8, the ratchet 7 disengages from the latch 6 and this allows the latch 6 to pivotally move in the unlatch direction. However, sometimes there are cases where the rear door does not pop up due to the weight of the snow and the latch 6 stays at the latch position. When the above state occurs, the following disadvantage occurs. Namely, although the ratchet 7 is release-operated by the motive power of the motor 18, when the driving of the motor 18 stops, the latched state is entered in which the ratchet 7 engages again with the latch 6 and the rear door cannot be opened.

However, in the present embodiment, by moving the ratchet 7 to the release position, the ratchet 7 is held at the release position until the memory lever 9 moves to the block position and the latch 6 moves to the unlatch position, so that it is possible to prevent the disadvantage from occurring in the above-described environment.

(Operation by Vehicle Door Lock Device 1 when Rear Door is Closed)

When the rear door is in an open state the meshing unit 3, as shown in FIG. 9, is in an unlatched state in which the latch 6 stays at the unlatch position, the ratchet 7 stays at the wait position, and the memory lever 9 stays at the unblock position. The actuator unit 4 is in the initial state in which the actuating member 19 is held at the neutral position.

In the state as shown in FIG. 9, when the rear door is closed, the striker 2 proceeds into the striker entry groove 51 of the base 5 and engages with the engagement groove 61 of the latch 6. In this manner, against the biasing force of the spring 12, the latch 6 pivotally moves from the unlatch position to the latch position by passing through the half latch position.

When the latch 6 pivotally moves to the latch position, as shown in FIG. 7, the ratchet 7 pivotally moves from the wait position in the engagement direction by the biasing force of the spring 14, and the claw part 71 engages with the full latch engagement part 62 of the latch 6. In this case, when the ratchet 7 pivotally moves in the engagement direction, the actuating member 19 is at the neutral position and the operated part 72 of the ratchet 7 can freely move in the slit 194 of the actuating member 19 in the rotation axial direction of the actuating member 19, so that there is no hindrance for the movement to the ratchet 7.

In this manner, as shown in FIG. 7, the meshing unit 3 pivotally moves to the latch position in which the latch 6 engages with the striker 2, and enters the latched state in which the ratchet 7 engages with the full latch engagement part 62 of the latch 6. In this manner, the rear door is held at the closed position. Meanwhile, when the rear door is closed, the actuator unit 4 does not change whatsoever from the initial state in which the actuating member 19 is at the neutral position.

While the other embodiment of the present invention has been explained so far, the present embodiment can be variously modified as long as such various modifications do not deviate from the substance of the present invention, as follows.

(i) The vehicle door lock device 1 is attached to a vehicle body and the striker 2 is attached to the rear door.

(ii) As the door to which the vehicle door lock device 1 is attached, a side door or a slide door is used instead of the rear door.

What is claimed is:

1. A vehicle door lock device configured to engage a vehicle body and a door, comprising:

a casing including a base fixed to either of the door or the vehicle body;

a latch supported by the base such that the latch pivotally moves about a latch shaft oriented in a vertical direction and wherein the latch engages with a striker provided on the other of the door and the vehicle body when the door is closed;

a ratchet supported on the base such that the ratchet pivotally moves about a ratchet shaft oriented in the vertical direction, wherein the ratchet holds the latch at a latch position when the ratchet is at an engagement position for engaging with the latch, and wherein the ratchet pivotally moves to a release position at which the ratchet moves from the engagement position in a release direction to disengage from the latch and the latch moves to an unlatch position;

a motor having a rotary shaft disposed on the casing such that the rotary shaft is oriented in a horizontal direction and having a pinion gear fastened to the rotary shaft; and an actuating member having a gear part supported in the casing to pivotally move such that a rotation axis is oriented in the horizontal direction, and wherein the gear part engages with the pinion gear, and wherein a spiral groove line part directly engages with an end of the ratchet, and wherein the ratchet moves from the engagement position to the release position when the groove line part undergoes one rotation in one direction driven by rotation of the rotary shaft, wherein, in a planar view taken along the vertical direction, the actuating member is disposed between the motor and a grouping of the latch and the ratchet such that the gear part is on the latch side and disposed outside a movement range of the latch, the spiral groove line part of the actuating member being arranged within the movement range of the ratchet.

2. The vehicle door lock device according to claim 1, wherein the actuating member undergoes one rotation in the one direction from a neutral position by the rotation of the rotary shaft, comes into contact with the operated part of the ratchet, and stops at the neutral position.

3. The vehicle door lock device according to claim 2, wherein the actuating member has an elastic part that fits into an engagement groove provided in the casing at the neutral position to enable the actuating member to be held at the neutral position.

4. The vehicle door lock device according to claim 3, wherein the engagement groove is shaped to allow the actuating member to rotate in the one direction, while preventing the actuating member from rotating in a direction opposite to the one direction, when the elastic part fits into the engagement groove.

5. The vehicle door lock device according to claim 1, wherein a lead angle of the groove line part in the actuating member is varied such that, the further the ratchet is moved from a neutral position of the actuating member in the release direction, the lower the movement speed of the ratchet is.

6. The vehicle door lock device according to claim 1, wherein a lead angle of the groove line part in the actuating member is varied such that, the further the ratchet is moved from a neutral position of the actuating member in the release direction, the higher the movement speed of the ratchet is.

7. The vehicle door lock device according to claim 1, wherein a lead angle of the groove line part in the actuating member is varied such that the movement speed of the ratchet becomes higher at least from a neutral position toward an intermediate position of the actuating member.

8. The vehicle door lock device according to claim 1, wherein a lead angle of the groove line part in the actuating member is varied such that: the further the ratchet is moved from a neutral position toward an intermediate position of the actuating member, the higher the movement speed of the ratchet is; and, the further the ratchet is moved from the intermediate position toward the release position of the ratchet, the lower the movement speed of the ratchet is.

9. The vehicle door lock device according to claim 1, wherein the actuating member has a slit that extends in a rotation axial direction and matches a trajectory of the operated part of the ratchet when the actuating member is at the neutral position, and allows the operated part of the ratchet to freely move in the slit in the rotation axial direction when the actuating member is at the neutral position.

10. The vehicle door lock device according to claim 1, wherein, the casing further includes a meshing cover which is fixed to the base and covers the latch and the ratchet, and wherein the meshing cover supports a memory lever that moves to a block position at which the memory lever holds the ratchet at the release position when the ratchet moves to the release position.

11. The vehicle door lock device according to claim 10, wherein, when the latch moves to the unlatch position, the memory lever comes into contact with the latch and the memory lever moves from the block position to an unblock position which permits pivotal movement of the ratchet to the engagement position.

12. The vehicle door lock device according to claim 1, wherein the casing further includes a motor cover fixed to the base and supports the motor and the actuating member within the motor cover.

13. The vehicle door lock device according to claim 12, wherein the configuration in which the latch and the ratchet are supported on the base is used as an engagement unit, the configuration in which the motor and the actuating member are supported within the motor cover is used as an actuator unit, and the motor cover of the actuator unit is fixed to the base of the engagement unit, so that the operated part of the ratchet engages with the groove line part of the actuating member.

14. The vehicle door lock device according to claim 12, wherein, in the motor cover, an electrically-conductive terminal to be electrically connected to the motor is accommodated and a connector is provided with plug-in and plug-out directions of a connection-counterpart connector oriented in the vertical direction.

15. The vehicle door lock device of claim 1, wherein in the planar view, the gear part, the latch, and the ratchet are arranged with respect to one another such that the gear part is closer to the latch than to the ratchet.

16. The vehicle door lock device according to claim 1, wherein, among the movable elements including the latch, the ratchet, the motor, the lead screw, and the gear part, a dimension H in upward and downward directions of a part in which an uppermost part of the gear part is located is maximized.

* * * * *